United States Patent
Han

(10) Patent No.: US 12,445,719 B2
(45) Date of Patent: Oct. 14, 2025

(54) AUDIO PROCESSING METHOD AND DEVICE

(71) Applicant: HUAWEI TECHNOLOGIES CO., LTD., Guangdong (CN)

(72) Inventor: Bo Han, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 255 days.

(21) Appl. No.: 17/909,623

(22) PCT Filed: Mar. 1, 2021

(86) PCT No.: PCT/CN2021/078542
§ 371 (c)(1),
(2) Date: Sep. 6, 2022

(87) PCT Pub. No.: WO2021/175197
PCT Pub. Date: Sep. 10, 2021

(65) Prior Publication Data
US 2023/0116044 A1    Apr. 13, 2023

(30) Foreign Application Priority Data
Mar. 6, 2020 (CN) .......................... 202010153655.8

(51) Int. Cl.
*H04N 23/667* (2023.01)
*H04N 23/63* (2023.01)
(Continued)

(52) U.S. Cl.
CPC ......... *H04N 23/667* (2023.01); *H04N 23/631* (2023.01); *H04N 23/632* (2023.01);
(Continued)

(58) Field of Classification Search
CPC .... H04N 23/667; H04N 23/632; H04N 23/69; H04N 5/2624; H04N 5/772; H04N 23/45;
(Continued)

(56) References Cited

U.S. PATENT DOCUMENTS

2011/0050963 A1    3/2011  Watabe
2013/0235224 A1    9/2013  Park et al.
(Continued)

FOREIGN PATENT DOCUMENTS

CN    101189913 A    5/2008
CN    104699445 A    6/2015
(Continued)

OTHER PUBLICATIONS

International Search Report and Written Opinion in International Appln. No. PCT/CN2021/078542, mailed on May 25, 2021, 17 pages (with English translation).
(Continued)

*Primary Examiner* — Timothy J Henn
(74) *Attorney, Agent, or Firm* — Fish & Richardson P.C.

(57) ABSTRACT

Embodiments of this application provide an audio processing method and a device. In a multi-channel video recording mode, a plurality of channels of video images and a plurality of channels of audio can be recorded simultaneously, and different audio can be played during video playback. A specific solution is as follows: After detecting an operation of opening a camera by a user, an electronic device displays a shooting preview interface, and then enters a multi-channel video recording mode. After detecting a shooting operation of the user, the electronic device displays a shooting interface, where the shooting interface includes a plurality of channels of video images. Then, the electronic device records the plurality of channels of video images, and records audio corresponding to each of the plurality of
(Continued)

channels of video images based on a shooting angle of view corresponding to each channel of video image.

20 Claims, 19 Drawing Sheets

(51) Int. Cl.
    *H04N 23/69*     (2023.01)
    *H04R 3/00*     (2006.01)

(52) U.S. Cl.
    CPC ............. *H04N 23/69* (2023.01); *H04R 3/005* (2013.01); *H04R 2203/12* (2013.01)

(58) Field of Classification Search
    CPC .. H04N 23/631; H04N 23/633; H04N 9/8211; H04N 23/635; H04N 23/698; H04N 23/90; H04N 5/76; H04N 5/9155; H04N 5/9202; H04N 5/9265; H04N 23/67; H04R 3/005; H04R 2203/12; H04R 1/406; H04R 2499/11; H04R 1/08; H04R 3/00; G11B 27/031; G11B 27/105; G11B 27/34
    See application file for complete search history.

(56) References Cited

U.S. PATENT DOCUMENTS

| | | | | |
|---|---|---|---|---|
| 2013/0328997 A1* | 12/2013 | Desai | ................... | H04N 7/147 348/14.02 |
| 2013/0342730 A1* | 12/2013 | Lee | ................... | H04R 5/04 348/231.4 |
| 2014/0029761 A1* | 1/2014 | Maenpaa | ................ | H04R 3/005 381/92 |
| 2014/0184725 A1* | 7/2014 | Wu | ..................... | H04N 9/3179 348/14.07 |
| 2014/0192212 A1* | 7/2014 | He | ..................... | H04N 23/90 399/296 |
| 2015/0237268 A1* | 8/2015 | Vaiaoga | ................. | H04N 23/90 348/218.1 |
| 2017/0006399 A1* | 1/2017 | Maziewski | .......... | H04R 29/004 |
| 2017/0244879 A1* | 8/2017 | Bezjian | ................. | H04N 23/45 |
| 2018/0091847 A1* | 3/2018 | Wu | ..................... | H04N 21/2383 |
| 2018/0249276 A1* | 8/2018 | Godfrey | ................ | H04R 1/406 |
| 2022/0159183 A1* | 5/2022 | Li | ......................... | H04N 23/635 |
| 2022/0272200 A1* | 8/2022 | Chen | .................... | H04M 3/567 |

FOREIGN PATENT DOCUMENTS

| | | |
|---|---|---|
| CN | 103888703 B | 11/2015 |
| CN | 106954085 A | 7/2017 |
| CN | 110072070 A | 7/2019 |
| EP | 3544012 A1 | 9/2019 |
| WO | 2019123149 A1 | 6/2019 |

OTHER PUBLICATIONS

Extended European Search Report in European ApplN No. 21765267.6, dated Jun. 5, 2023, 8 pages.

* cited by examiner (a)

(b)

(a)

(b)

AUDIO PROCESSING METHOD AND DEVICE

CROSS-REFERENCE TO RELATED APPLICATIONS

This application is a National Stage of International Application No. PCT/CN2021/078542, filed on Mar. 1, 2021, which claims priority to Chinese Patent Application No. 202010153655.8, filed on Mar. 6, 2020, both of which are hereby incorporated by reference in their entireties.

TECHNICAL FIELD

Embodiments of this application relate to the field of electronic technologies, and in particular, to an audio processing method and a device.

BACKGROUND

As a computing capability and a hardware capability of an electronic device such as a mobile phone or a tablet computer improve, a video recording function of the electronic device becomes increasingly powerful. For example, some electronic devices may support multi-channel video recording, which is alternatively referred to as multi-view video recording.

In an existing multi-channel video recording mode, the electronic device may record audio and a plurality of channels of video images. For example, the electronic device may separately record a panoramic video image and a close-up video image. During video playback, the electronic device may play the audio and the plurality of channels of video images.

SUMMARY

Embodiments of this application provide an audio processing method and a device. In a multi-channel video recording mode, a plurality of channels of video images and a plurality of channels of audio can be recorded simultaneously, and different audio can be played during video playback, to improve audio experience of a user during multi-channel video recording.

To achieve the foregoing objective, the following technical solutions are used in embodiments of this application.

According to an aspect, embodiments of this application provide an audio processing method. The method includes: An electronic device displays a shooting preview interface after detecting an operation of opening a camera by a user. Then, the electronic device enters a multi-channel video recording mode. The electronic device displays a shooting interface after detecting a shooting operation of the user, where the shooting interface includes a plurality of channels of video images. Then, the electronic device records a multi-channel video. The electronic device records audio corresponding to each of the plurality of channels of video images based on a shooting angle of view corresponding to each channel of video image. When the plurality of channels of video images include a first channel of video image and a second channel of video image, the electronic device records audio corresponding to the first channel of video image based on a shooting angle of view corresponding to the first channel of video image, and records audio corresponding to the second channel of video image based on a shooting angle of view corresponding to the second channel of video image.

In this solution, in the multi-channel video recording mode, when recording the plurality of channels of video images, the electronic device may record a plurality of channels of audio corresponding to the plurality of channels of video images based on the shooting angle of view corresponding to each channel of video image, so that the recorded audio matches different video images and shooting angles of view. In this way, during video playback, the user can select to play audio that matches a video image and a shooting angle of view that the user pays attention to, to improve audio experience of the user.

In a possible design, each channel of video image corresponds to one shooting angle of view.

In this way, the audio corresponding to each channel of video image also corresponds to one shooting angle of view.

In another possible design, the shooting angle of view corresponding to each channel of video image is variable.

In this way, a video corresponding to each channel of video image is also dynamic audio matching a shooting angle of view that changes in real time.

In another possible design, after the electronic device records the audio corresponding to each channel of video image, the method further includes: The electronic device generates a multi-channel recorded video after detecting an operation of stopping shooting by the user, where the multi-channel recorded video further includes the audio corresponding to each channel of video image. The electronic device displays a video play interface after detecting an operation of playing the multi-channel recorded video by the user, where the video play interface includes the plurality of channels of video images.

In this way, during video playback, the electronic device may play each channel of video image by default.

In another possible design, after the electronic device detects the operation of playing the multi-channel recorded video by the user, the method further includes: after detecting an operation of playing the audio corresponding to the first channel of video image by the user, the electronic device plays the audio corresponding to the first channel of video image, where the first channel of video image is one of the plurality of channels of video images. If the electronic device plays other audio corresponding to the plurality of channels of video images before playing the audio corresponding to the first channel of video image, the electronic device stops playing the other audio.

In this solution, the electronic device may play one channel of audio indicated by the user, and stop playing another channel of audio.

In another possible design, the video play interface includes an audio play control corresponding to each channel of video image, and that the electronic device detects an operation of playing the audio corresponding to the first channel of video image by the user includes: The electronic device detects an operation of tapping an audio play control corresponding to the first channel of video image by the user.

In this solution, the user may tap an audio play control to indicate to play audio corresponding to the audio play control.

In another possible design, before the electronic device detects the operation of playing the audio corresponding to the first channel of video image by the user, the method further includes: The electronic device plays, by default, audio corresponding to a second channel of video image in the plurality of channels of video images.

In this solution, during video playback, the electronic device may play a channel of audio by default, so that a sound can be played for the user in time during video playback.

In another possible design, a shooting angle of view corresponding to the second channel of video image played by the electronic device by default is a preset shooting angle of view.

In other words, the electronic device may play, by default, audio corresponding to the preset shooting angle of view. For example, the preset shooting angle of view may be a wide-angle angle of view.

In another possible design, after the electronic device displays the video play interface, the method further includes: After detecting an operation of playing the first channel of video image in the plurality of channels of video images by the user, the electronic device displays the first channel of video image on the video play interface and stops displaying a channel of video image other than the first channel of video image. The electronic device automatically plays the audio corresponding to the first channel of video image.

In this solution, the electronic device may play only one channel of video image according to an indication of the user, and automatically play audio corresponding to the channel of video image.

For example, that the electronic device displays the first channel of video image on the video play interface includes: displaying the first channel of video image in a scaling up manner or in full screen on the video play interface. In this way, a single channel of video image that the user indicates to play can be highlighted.

In another possible design, before the electronic device displays the shooting interface, the method further includes: The electronic device determines a target shooting mode, where the target shooting mode indicates a quantity of channels of to-be-recorded video images. That the electronic device displays a shooting interface includes: The electronic device displays the shooting interface based on the quantity of channels of to-be-recorded video images corresponding to the target shooting mode.

In this solution, the electronic device may first determine the target shooting mode, and then display the shooting interface based on the target representation mode.

In another possible design, the target shooting mode further indicates a correspondence between each channel of video image and a shooting angle of view. That the electronic device records audio corresponding to each of the plurality of channels of video images based on a shooting angle of view corresponding to each channel of video image includes: The electronic device determines the shooting angle of view corresponding to each channel of video image based on the correspondence that is between each channel of video image and a shooting angle of view and that corresponds to the target shooting mode. The electronic device records the audio corresponding to each channel of video image based on the shooting angle of view corresponding to each channel of video image.

In this solution, the electronic device may determine the shooting angle of view based on the target shooting mode, to record the audio corresponding to the video image based on the shooting angle of view.

For example, the target shooting mode includes: a combination mode of a wide-angle angle of view and a zoom angle of view, a combination mode of a wide-angle angle of view and a front-facing angle of view, a combination mode of a zoom angle of view and a front-facing angle of view, or a combination mode of a wide-angle angle of view, a zoom angle of view, and a front-facing angle of view, a zoom ratio corresponding to the wide-angle angle of view is less than or equal to a preset value, and a zoom ratio corresponding to the zoom angle of view is greater than the preset value.

In another possible design, the target shooting mode is a preset shooting mode.

For example, the preset shooting mode may be the combination mode of the wide-angle angle of view and the zoom angle of view.

In another possible design, that the electronic device records audio corresponding to each of the plurality of channels of video images based on a shooting angle of view corresponding to each channel of video image includes: The electronic device determines the shooting angle of view corresponding to each channel of video image based on a front-facing/rear-facing feature and a value relationship between a zoom ratio corresponding to each channel of video image and a preset value. The electronic device records the audio corresponding to each channel of video image based on the shooting angle of view corresponding to each channel of video image. When the plurality of channels of video images include the first channel of video image and the second channel of video image, the electronic device determines the shooting angle of view corresponding to the first channel of video image based on a front-facing/rear-facing feature and a value relationship between a zoom ratio corresponding to the first channel of video image and the preset value, and determines the shooting angle of view corresponding to the second channel of video image based on a front-facing/rear-facing feature and a value relationship between a zoom ratio corresponding to the second channel of video image and the preset value.

In this solution, the electronic device may determine a shooting angle of view based on a front-facing/rear-facing feature and a value relationship between a zoom ratio corresponding to a video image and the preset value, to record audio corresponding to the video image based on the shooting angle of view.

In another possible design, after the electronic device determines the target shooting mode, the method further includes: The electronic device detects an operation of switching the target shooting mode by the user. The electronic device switches the target shooting mode.

In other words, in a shooting process of multi-channel video recording, the electronic device may further switch the target shooting mode.

In another possible design, the shooting angle of view corresponding to the first channel of video image in the plurality of channels of video images is a first shooting angle of view, and that the electronic device records the audio corresponding to the first channel of video image based on the shooting angle of view corresponding to the first channel of video image includes: The electronic device obtains to-be-processed audio data corresponding to the first channel of video image based on a collected sound signal. The electronic device performs timbre correction processing, stereo beam forming, and gain control processing on the to-be-processed audio data based on the first shooting angle of view. The electronic device records the audio corresponding to the first channel of video image based on audio data that has undergone the gain control processing.

For example, the first shooting angle of view may be a wide-angle angle of view. The electronic device may sequentially perform audio processing such as timbre correction processing, stereo beam forming, and gain control processing on the to-be-processed audio data based on the wide-angle angle of view, and then record corresponding audio.

In another possible design, the shooting angle of view corresponding to the first channel of video image in the plurality of channels of video images is a second shooting angle of view, and that the electronic device records the audio corresponding to the first channel of video image based on the shooting angle of view corresponding to the first channel of video image includes: The electronic device obtains to-be-processed audio data corresponding to the first channel of video image based on a collected sound signal. The electronic device performs timbre correction processing, stereo/mono beam forming, ambient noise control processing, and gain control processing on the to-be-processed audio data based on the second shooting angle of view. The electronic device records the audio corresponding to the first channel of video image based on audio data that has undergone the gain control processing.

For example, the first shooting angle of view may be a zoom angle of view. The electronic device may sequentially perform audio processing such as timbre correction processing, stereo/mono beam forming, ambient noise control processing, and gain control processing on the to-be-processed audio data based on the wide-angle angle of view, and then record corresponding audio.

In another possible design, the shooting angle of view corresponding to the first channel of video image in the plurality of channels of video images is a third shooting angle of view, and that the electronic device records the audio corresponding to the first channel of video image based on the shooting angle of view corresponding to the first channel of video image includes: The electronic device obtains to-be-processed audio data corresponding to the first channel of video image based on a collected sound signal. The electronic device performs timbre correction processing, stereo/mono beam forming, human voice enhancement processing, and gain control processing on the to-be-processed audio data based on the third shooting angle of view. The electronic device records the audio corresponding to the first channel of video image based on audio data that has undergone the gain control processing.

For example, the first shooting angle of view may be a front-facing angle of view. The electronic device may sequentially perform audio processing such as timbre correction processing, stereo/mono beam forming, human voice enhancement processing, and gain control processing on the to-be-processed audio data based on the front-facing angle of view, and then record corresponding audio.

In another possible design, the electronic device includes a directional microphone, the directional microphone points to a rear-facing camera direction, and the shooting angle of view corresponding to the first channel of video image in the plurality of channels of video images is the second shooting angle of view. That the electronic device records the audio corresponding to the first channel of video image based on the shooting angle of view corresponding to the first channel of video image includes: The electronic device obtains to-be-processed audio data corresponding to the first channel of video image based on a collected sound signal. The electronic device performs timbre correction processing, ambient noise control processing, and gain control processing on the to-be-processed audio data based on the second shooting angle of view. The electronic device records the audio corresponding to the first channel of video image based on audio data that has undergone the gain control processing.

In another possible design, the first shooting angle of view may be a zoom angle of view. The electronic device may sequentially perform audio processing such as timbre correction processing, ambient noise control processing, and gain control processing on the to-be-processed audio data based on the wide-angle angle of view, and then record corresponding audio.

In another possible design, the electronic device includes a directional microphone, the directional microphone points to a front-facing camera direction, and the shooting angle of view corresponding to the first channel of video image in the plurality of channels of video images is the third shooting angle of view. That the electronic device records the audio corresponding to the first channel of video image based on the shooting angle of view corresponding to the first channel of video image includes. The electronic device obtains to-be-processed audio data corresponding to the first channel of video image based on a collected sound signal. The electronic device performs timbre correction processing, human voice enhancement processing, and gain control processing on the to-be-processed audio data based on the third shooting angle of view. The electronic device records the audio corresponding to the first channel of video image based on audio data that has undergone the gain control processing.

For example, the first shooting angle of view may be a front-facing angle of view. The electronic device may sequentially perform audio processing such as timbre correction processing, human voice enhancement processing, and gain control processing on the to-be-processed audio data based on the front-facing angle of view, and then record corresponding audio.

According to another aspect, embodiments of this application provide an electronic device, including: a plurality of microphones, configured to collect sound signals; a screen, configured to display an interface; an audio play component, configured to play audio; one or more processors; a memory; and one or more computer programs. The one or more computer programs are stored in the memory, and the one or more computer programs include instructions. When the instructions are executed by the electronic device, the electronic device is enabled to perform the following steps: displaying a shooting preview interface after detecting an operation of opening a camera by a user; entering a multi-channel video recording mode; displaying a shooting interface after detecting a shooting operation of the user, where the shooting interface includes a plurality of channels of video images; recording a multi-channel video; and recording audio corresponding to each of the plurality of channels of video images based on a shooting angle of view corresponding to each channel of video image.

In this solution, in the multi-channel video recording mode, the electronic device may collect a sound signal by using the microphones, collect a video image by using the camera, display an interface by using the screen, and play audio by using the audio play component. In addition, when recording the plurality of channels of video images, the electronic device records a plurality of channels of audio corresponding to the plurality of channels of video images based on the shooting angle of view corresponding to each channel of video image, so that the recorded audio matches different video images and shooting angles of view. In this way, during video playback, the user can select to play audio that matches a video image and a shooting angle of view that the user pays attention to, to improve audio experience of the user.

In a possible design, the plurality of microphones include at least three microphones, and at least one microphone is disposed at each of the top, the bottom, and the rear of the electronic device.

In this way, the electronic device may collect sound signals in all directions by using the at least three microphones, to subsequently obtain a sound signal within each sound pickup range from the sound signals.

For example, the microphone is a built-in component or an external accessory.

When the microphone is an external accessory, the microphone may be a directional microphone. In this case, at a zoom angle of view or a front-facing angle of view, a mono/stereo beam does not need to be formed during audio processing.

In another possible design, each channel of video image corresponds to one shooting angle of view.

In another possible design, the shooting angle of view corresponding to each channel of video image is variable.

In another possible design, when the instructions are executed by the electronic device, the electronic device is further enabled to perform the following steps: after recording the audio corresponding to each channel of video image and detecting an operation of stopping shooting by the user, generating a multi-channel recorded video, where the multi-channel recorded video further includes the audio corresponding to each channel of video image, and displaying a video play interface after detecting an operation of playing the multi-channel recorded video by the user, where the video play interface includes the plurality of channels of video images.

In another possible design, when the instructions are executed by the electronic device, the electronic device is further enabled to perform the following steps: after detecting the operation of playing the multi-channel recorded video by the user, and detecting an operation of playing audio corresponding to a first channel of video image by the user, playing the audio corresponding to the first channel of video image, where the first channel of video image is one of the plurality of channels of video images; and if other audio in the plurality of channels of audio is played before the audio corresponding to the first channel of video image is played, stopping playing the other audio.

In another possible design, the video play interface includes an audio play control corresponding to each channel of video image, and the detecting an operation of playing audio corresponding to a first channel of video image by the user includes: detecting an operation of tapping an audio play control corresponding to the first channel of video image by the user.

In another possible design, when the instructions are executed by the electronic device, the electronic device is further enabled to perform the following step: before detecting the operation of playing the audio corresponding to the first channel of video image by the user, playing, by default, audio corresponding to a second channel of video image in the plurality of channels of video images.

In another possible design, a shooting angle of view corresponding to the second channel of video image is a preset shooting angle of view.

In another possible design, when the instructions are executed by the electronic device, the electronic device is further enabled to perform the following steps: after displaying the video play interface and detecting an operation of playing a first channel of video image in the plurality of channels of video images by the user, displaying the first channel of video image on the video play interface, and stopping displaying a channel of video image other than the first channel of video image; and automatically playing audio corresponding to the first channel of video image.

In another possible design, when the instructions are executed by the electronic device, the electronic device is further enabled to perform the following step: determining a target shooting mode before displaying the shooting interface, where the target shooting mode indicates a quantity of channels of to-be-recorded video images. The displaying a shooting interface includes: displaying the shooting interface based on the quantity of channels of to-be-recorded video images corresponding to the target shooting mode.

In another possible design, the target shooting mode further indicates a correspondence between each channel of video image and a shooting angle of view, and the recording audio corresponding to each of the plurality of channels of video images based on a shooting angle of view corresponding to each channel of video image includes: determining the shooting angle of view corresponding to each channel of video image based on the correspondence that is between each channel of video image and a shooting angle of view and that corresponds to the target shooting mode: and recording the audio corresponding to each channel of video image based on the shooting angle of view corresponding to each channel of video image.

In another possible design, the target shooting mode includes: a combination mode of a wide-angle angle of view and a zoom angle of view, a combination mode of a wide-angle angle of view and a front-facing angle of view, a combination mode of a zoom angle of view and a front-facing angle of view, or a combination mode of a wide-angle angle of view, a zoom angle of view, and a front-facing angle of view, a zoom ratio corresponding to the wide-angle angle of view is less than or equal to a preset value, and a zoom ratio corresponding to the zoom angle of view is greater than the preset value.

In another possible design, the target shooting mode is a preset shooting mode.

In another possible design, the recording audio corresponding to each of the plurality of channels of video images based on a shooting angle of view corresponding to each channel of video image includes: determining the shooting angle of view corresponding to each channel of video image based on a front-facing/rear-facing feature and a value relationship between a zoom ratio corresponding to each channel of video image and a preset value; and recording the audio corresponding to each channel of video image based on the shooting angle of view corresponding to each channel of video image.

In another possible design, when the instructions are executed by the electronic device, the electronic device further performs the following steps: after determining the target shooting mode, detecting an operation of switching the target shooting mode by the user; and switching the target shooting mode.

In another possible design, a shooting angle of view corresponding to the first channel of video image in the plurality of channels of video images is a first shooting angle of view. The recording the audio corresponding to the first channel of video image based on the shooting angle of view corresponding to the first channel of video image includes: obtaining to-be-processed audio data corresponding to the first channel of video image based on a collected sound signal; performing timbre correction processing, stereo beam forming, and gain control processing on the to-be-processed audio data based on the first shooting angle of view: and recording the audio corresponding to the first channel of video image based on audio data that has undergone the gain control processing.

In another possible design, a shooting angle of view corresponding to the first channel of video image in the plurality of channels of video images is a second shooting angle of view. The recording the audio corresponding to the first channel of video image based on the shooting angle of view corresponding to the first channel of video image includes: obtaining to-be-processed audio data corresponding to the first channel of video image based on a collected sound signal; performing timbre correction processing, stereo/mono beam forming, ambient noise control processing, and gain control processing on the to-be-processed audio data based on the second shooting angle of view; and recording the audio corresponding to the first channel of video image based on audio data that has undergone the gain control processing.

In another possible design, a shooting angle of view corresponding to the first channel of video image in the plurality of channels of video images is a third shooting angle of view. The recording the audio corresponding to the first channel of video image based on the shooting angle of view corresponding to the first channel of video image includes: obtaining to-be-processed audio data corresponding to the first channel of video image based on a collected sound signal; performing timbre correction processing, stereo/mono beam forming, human voice enhancement processing, and gain control processing on the to-be-processed audio data based on the third shooting angle of view; and recording the audio corresponding to the first channel of video image based on audio data that has undergone the gain control processing.

In another possible design, the electronic device includes a directional microphone, the directional microphone points to a rear-facing camera direction, and the shooting angle of view corresponding to the first channel of video image in the plurality of channels of video images is the second shooting angle of view. The recording the audio corresponding to the first channel of video image based on the shooting angle of view corresponding to the first channel of video image includes: obtaining to-be-processed audio data corresponding to the first channel of video image based on a collected sound signal; performing timbre correction processing, ambient noise control processing, and gain control processing on the to-be-processed audio data based on the second shooting angle of view: and recording the audio corresponding to the first channel of video image based on audio data that has undergone the gain control processing.

In another possible design, the electronic device includes a directional microphone, the directional microphone points to a front-facing camera direction, and the shooting angle of view corresponding to the first channel of video image in the plurality of channels of video images is the third shooting angle of view. The recording the audio corresponding to the first channel of video image based on the shooting angle of view corresponding to the first channel of video image includes: obtaining to-be-processed audio data corresponding to the first channel of video image based on a collected sound signal; performing timbre correction processing, human voice enhancement processing, and gain control processing on the to-be-processed audio data based on the third shooting angle of view: and recording the audio corresponding to the first channel of video image based on audio data that has undergone the gain control processing.

According to another aspect, embodiments of this application provide an audio processing apparatus. The apparatus is included in an electronic device. The apparatus has a function of implementing behavior of the electronic device in any method in the foregoing aspects and the possible designs, so that the electronic device performs the audio processing method performed by the electronic device in any one of the possible designs of the foregoing aspects. The function may be implemented by hardware, or may be implemented by hardware executing corresponding software. The hardware or the software includes at least one module or unit corresponding to the foregoing function. For example, the apparatus may include an audio processing module, a microphone, a camera, or the like.

According to still another aspect, embodiments of this application provide an electronic device, including one or more processors and a memory. The memory stores code. When the code is executed by the electronic device, the electronic device is enabled to perform the audio processing method performed by the electronic device in any possible design of the foregoing aspects.

According to another aspect, embodiments of this application provide a computer-readable storage medium, including computer instructions. When the computer instructions are run on an electronic device, the electronic device is enabled to perform the audio processing method according to any possible design of the foregoing aspects.

According to still another aspect, embodiments of this application provide a computer program product. When the computer program product is run on a computer, the computer is enabled to perform the audio processing method performed by the electronic device in any possible design of the foregoing aspects.

According to another aspect, embodiments of this application provide a chip system, and the chip system is used in an electronic device. The chip system includes one or more interface circuits and one or more processors. The interface circuit and the processor are interconnected through a line. The interface circuit is configured to receive a signal from a memory of the electronic device, and send the signal to the processor. The signal includes computer instructions stored in the memory. When the processor executes the computer instructions, the electronic device is enabled to perform the audio processing method in any possible design of the foregoing aspects.

For beneficial effects corresponding to the foregoing other aspects, refer to the descriptions of the beneficial effects in the method aspects. Details are not described herein again.

DESCRIPTION OF EMBODIMENTS

Figure 1A:
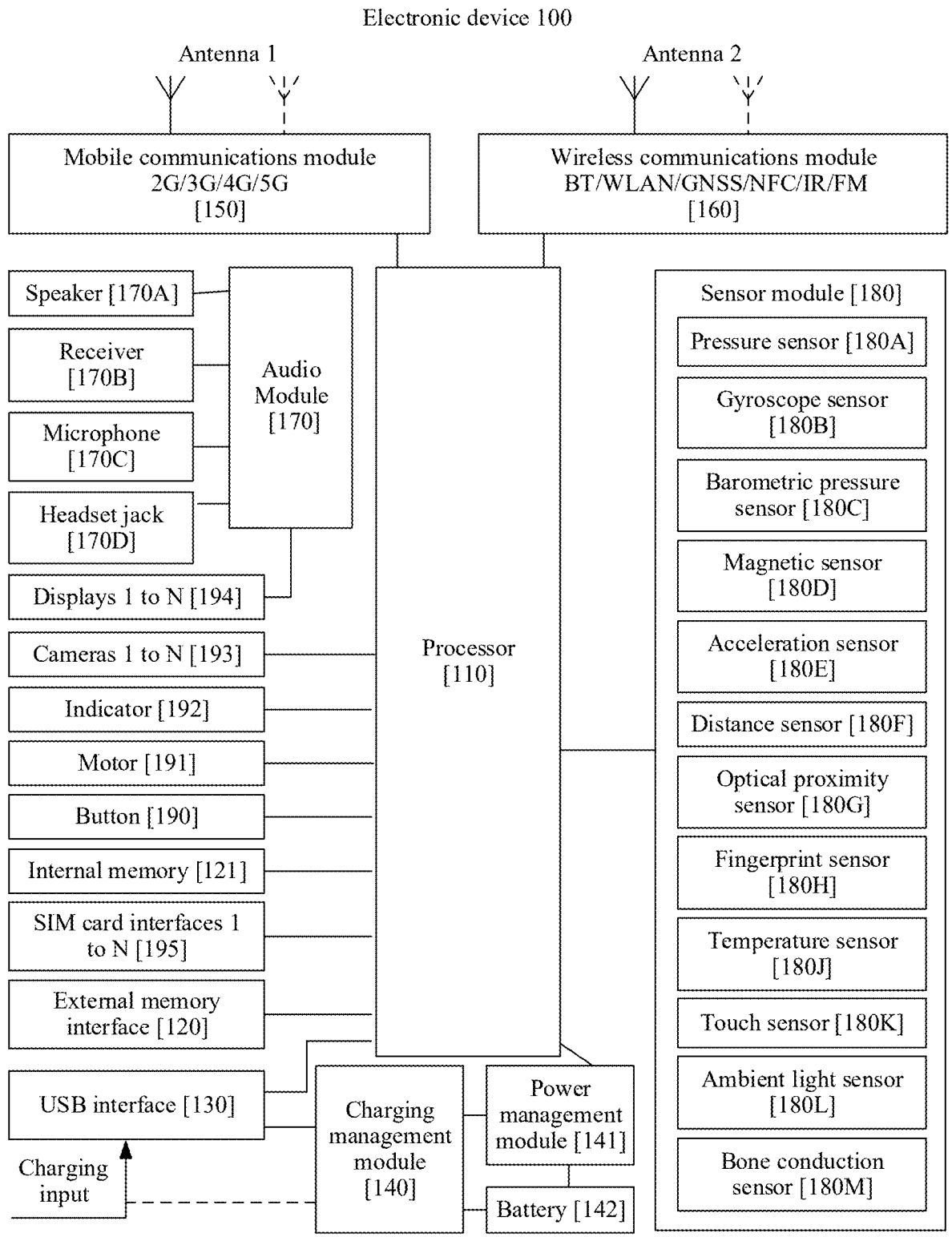
FIG. 1A is a schematic diagram of a structure of an electronic device according to an embodiment of this application.

The following describes the technical solutions in embodiments of this application with reference to the accompanying drawings in embodiments of this application. In description in embodiments of this application, "/" means "or" unless otherwise specified. For example, A/B may represent A or B. In this specification. "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments, unless otherwise specified, "a plurality of" means two or more.

In a multi-channel video recording mode (or referred to as a multi-view video recording mode), an electronic device may record a plurality of channels of video images in a video recording process, that is, record video images of a plurality of channels.

In embodiments of this application, in some cases, video images of different channels correspond to different shooting angles of view, and a shooting angle of view corresponding to each channel of video image is fixed in this video recording process. Multi-channel video recording in this case may also be referred to as multi-view video recording. This case is referred to as Case 1 below.

The shooting angles of view may be divided based on whether a to-be-shot object is a front-facing object or a rear-facing object, and/or a zoom ratio. For example, in embodiments of this application, the shooting angles of view may include a wide-angle angle of view, a zoom angle of view, and a front-facing angle of view. The wide-angle angle of view and the zoom angle of view belong to a rear-facing angle of view, and may also be respectively referred to as a rear-facing wide-angle angle of view and a rear-facing zoom angle of view. The wide-angle angle of view may be a shooting angle of view corresponding to a scene in which a zoom ratio is less than or equal to a preset value K. For example, the preset value K may be 2, 1.5, or 1. The zoom angle of view may be a shooting angle of view corresponding to a scene in which a zoom ratio is greater than the preset value K. The front-facing angle of view is a shooting angle of view corresponding to a front-facing shooting scene such as selfie.

For example, for a shooting mode in the multi-channel video recording mode, refer to Table 1. A shooting angle of view corresponding to the shooting mode may be a combination of any shooting angles of view of the wide-angle angle of view, the zoom angle of view, or the front-facing angle of view. As shown in Table 1, each shooting mode may include a plurality of channels, and each channel may correspond to one channel of video image and one shooting angle of view. The video images recorded in the shooting mode in the multi-channel video recording mode may include a combination of any channels of video images of a video image at the wide-angle angle of view, a video image at the zoom angle of view, or a video image at the front-facing angle of view. A shooting mode in Table 1 indicates a quantity of channels of to-be-recorded video images and a correspondence between each channel of video image and a shooting angle of view, and each channel of video image corresponds to one shooting angle of view.

TABLE 1

| Shooting mode | Shooting angle of view |
| --- | --- |
| Shooting mode 1 (also referred to as a combination mode of the wide-angle angle of view and the zoom angle of view) | Channel 1: the wide-angle angle of view; channel 2: the zoom angle of view |
| Shooting mode 2 (also referred to as a combination mode of the wide-angle angle of view and the front-facing angle of view) | Channel 1: the wide-angle angle of view; channel 2: the front-facing angle of view |
| Shooting mode 3 (also referred to as a combination mode of the zoom angle of view and the front-facing angle of view) | Channel 1: the zoom angle of view; channel 2: the front-facing angle of view |
| Shooting mode 4 (also referred to as a combination mode of the wide-angle angle of view, the zoom angle of view, and the front-facing angle of view) | Channel 1: the wide-angle angle of view; channel 2: the zoom angle of view; channel 3: the front-facing angle of view |

In another case, types of shooting angles of view corresponding to different channels of video images are variable, and this case is referred to as Case 2 below. For example, for a shooting mode in the multi-channel video recording mode in this case, refer to Table 2. For example, a shooting mode a in Table 2 includes a channel 1 and a channel 2. A shooting angle of view corresponding to the channel 1 may be switched between the wide-angle angle of view and the zoom angle of view. The channel 2 corresponds to the front-facing angle of view. A shooting mode in Table 2 indicates a quantity of channels of to-be-recorded video images, and a shooting angle of view corresponding to each channel of video image is variable.

TABLE 2

| Shooting mode | Shooting angle of view |
| --- | --- |
| Shooting mode a | Channel 1: switch between the wide-angle angle of view and the zoom angle of view<br>Channel 2: the front-facing angle of view |
| Shooting mode b | Channel 1: switch between the wide-angle angle of view and the zoom angle of view<br>Channel 2: the wide-angle angle of view<br>Channel 3: the front-facing angle of view |
| Shooting mode c | Channel 1: the wide-angle angle of view<br>Channel 2: switch between the zoom angle of view and the front-facing angle of view |
| Shooting mode d | Channel 1: switch between the wide-angle angle of view and the zoom angle of view<br>Channel 2: switch between the zoom angle of view and the front-facing angle of view |
| Shooting mode e | Channel 1: switch between the wide-angle angle of view, the zoom angle of view, and the front-facing angle of view<br>Channel 2: switch between the wide-angle angle of view; the zoom angle of view, and the front-facing angle of view |
| . . . | . . . |

Embodiments of this application provide an audio processing method in the multi-channel video recording mode. The electronic device can simultaneously record a plurality of channels of video images and a plurality of channels of audio in the multi-channel video recording mode. When playing back a multi-channel recorded video (video playback for short below), the electronic device may play different audio, so that audio experience of a user during multi-channel video recording can be improved.

In some embodiments of this application, in the multi-channel video recording mode, when recording video images corresponding to a plurality of shooting angles of view, the electronic device may further record audio corresponding to different shooting angles of view and video images. During video playback, the electronic device may play audio that matches different shooting angles of view and video images, so that played audio content corresponds to a shooting angle of view and a video image that a user pays attention to, to improve audio experience of the user during multi-channel video recording.

For example, audio content corresponding to the wide-angle angle of view may include a panoramic sound (that is, a 360-degree surrounding sound) in all directions, and audio content corresponding to the zoom angle of view mainly includes a sound within a zoom range. The zoom range is a shooting range corresponding to a current zoom ratio at the zoom angle of view. Audio content corresponding to the front-facing angle of view mainly includes a human voice within a front-facing range.

For example, in Case 1, when recording each channel of video image, the electronic device may further record audio according to a shooting angle of view used by each channel of video image. During video playback, the electronic device may play audio corresponding to a shooting angle of view and a video image that the user pays attention to.

For example, in the video recording mode 4 shown in Table 1, the electronic device may record a video image at the wide-angle angle of view corresponding to the channel 1, and record audio corresponding to the channel 1 based on the wide-angle angle of view. The electronic device may record a video image at the zoom angle of view corresponding to the channel 2, and record audio corresponding to the channel 2 based on the zoom angle of view. The electronic device may record a video image at the front-facing angle of view corresponding to the channel 3, and record audio corresponding to the channel 3 based on the front-facing angle of view.

In this way, during video playback, if the user pays attention to the wide-angle angle of view and the video image of the channel 1, audio played by the electronic device may be a panoramic sound corresponding to the wide-angle angle of view. If the user pays attention to the zoom angle of view and the video image of the channel 2, audio played by the electronic device may be a sound within a zoom range. If the user pays attention to the front-facing angle of view and the video image of the channel 3, audio played by the electronic device may be a human voice within a front-facing range. Therefore, audio played by the electronic device can match, in real time, a shooting angle of view and a video image that the user pays attention to, so that audio experience of the user can be improved.

For another example, in Case 2, when recording a video image corresponding to each channel, the electronic device may further record corresponding audio based on a changed shooting angle of view on each channel. During video playback, the electronic device may play audio that is of the channel 1 and that matches the shooting angle of view and the video image in real time. For example, in the shooting mode a shown in Table 2, the electronic device may record a video image at the wide-angle angle of view corresponding to the channel 1, and record audio corresponding to the wide-angle angle of view of the channel 1. Then, the electronic device records, after switching, a video image at the zoom angle of view corresponding to the channel 1, and record audio corresponding to the zoom angle of view of the channel 1. Then, the electronic device records, after switching, a video image at the wide-angle angle of view corresponding to the channel 1, and record audio corresponding to the wide-angle angle of view of the channel 1. In addition, while recording the video image and the audio at the wide-angle angle of view corresponding to the channel 1, the electronic device may further record the video image and the audio at the front-facing angle of view corresponding to the channel 2.

In this way, during video playback, when the user pays attention to the video image of the channel 1, as a shooting angle of view of the channel 1 changes, the electronic device may play a panoramic sound corresponding to the wide-angle angle of view, play a sound within a zoom range corresponding to the zoom angle of view, and then play a panoramic sound corresponding to the wide-angle angle of view, so that played audio matches a shooting angle of view and a video image in real time, to improve audio experience of the user. When the user pays attention to a video image of the channel 2, the electronic device may play a human voice within a front-facing range corresponding to the front-facing angle of view.

However, in an existing multi-channel video recording mode, the electronic device records only one channel of audio, and can play only the channel of audio. Audio content cannot match different shooting angles of view and video images, and cannot match, in real time, a shooting angle of view and a video image that the user pays attention to, resulting in poor audio experience of the user.

The audio processing method provided in embodiments of this application may be applied to an electronic device. For example, the electronic device may be specifically a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or a dedicated camera (for example, a single-lens reflex camera or a card camera). A specific type of the electronic device is not limited in embodiments of this application.

For example, FIG. 1A is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction execution.

The memory may be further disposed in the processor 110, and is configured to store instructions and data. In some embodiments, the memory in the processor 110 is a cache memory. The memory may store instructions or data that has just been used or is cyclically used by the processor 110. If the processor 110 needs to use the instructions or the data again, the processor 110 may directly invoke the instructions or the data from the memory. This avoids repeated access, reduces waiting time of the processor 110, and improves system efficiency.

The electronic device 100 may implement a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

In embodiments of this application, the display 194 may display a shooting preview interface, a video recording preview interface, and a shooting interface in a multi-channel video recording mode, may further display a video play interface during video playback, and the like.

The electronic device 100 may implement a shooting function by using the ISP, the camera 193, the video codec, the GPU, the display 194, the application processor, and the like.

The ISP may be configured to process data fed back by the camera 193. For example, during shooting, a shutter is pressed, light is transferred to a camera photosensitive element by using a lens, an optical signal is converted into an electrical signal, and the camera photosensitive element transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193. For example, in embodiments of this application, the ISP may control, based on a shooting parameter, the photosensitive element to perform exposure and shooting.

The camera 193 may be configured to capture a static image or a video. An optical image of an object is generated through the lens, and is projected onto the photosensitive element. The photosensitive element may be a charge-coupled device (charge coupled device, CCD) or a complementary metal-oxide-semiconductor (complementary metal-oxide-semiconductor, CMOS) photoelectric transistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1. The camera 193 may be located in an edge area of the electronic device, may be an off-screen camera, or may be a pop-up camera. The cameras 193 may include a rear-facing camera, and may further include a front-facing camera. A specific location and form of the camera 193 are not limited in embodiments of this application. The electronic device 100 may include cameras of one or more focal lengths. For example, cameras of different focal lengths may include a long-focus camera, a wide-angle camera, an ultra-wide-angle camera, a panoramic camera, or the like.

In embodiments of this application, in a multi-channel video recording mode, different cameras may be configured to capture video images corresponding to different angles of view. For example, the wide-angle camera, the ultra-wide-angle camera, or the panoramic camera may collect a video image at a wide-angle angle of view, the long-focus camera or the wide-angle camera may collect a video image at a zoom angle of view, and a front-facing camera collects a video image at a front-facing angle of view.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, with reference to a transfer mode between human brain neurons, and may further continuously perform self-learning. Applications such as intelligent cognition of the electronic device 100 may be implemented through the NPU, for example, image recognition, facial recognition, speech recognition, and text understanding.

The internal memory 121 may be configured to store computer executable program code. The executable program code includes instructions. The processor 110 runs the instructions stored in the internal memory 121, to implement various function applications and data processing of the electronic device 100. The internal memory 121 may include a program storage area and a data storage area. The program storage area may store an operating system, an application required by at least one function (for example, a voice playing function or an image playing function), and the like. The data storage area may store data (for example, an image captured by the electronic device 100, audio data, and a phone book) created in a process of using the electronic device 100, and the like.

In embodiments of this application, the processor 110 may run the instructions stored in the internal memory 121 to record video images at a plurality of shooting angles of view and audio corresponding to different shooting angles of view in the multi-channel video recording mode, so that audio corresponding to different shooting angles of view and video images can be played during video playback, and played audio matches a shooting angle of view and a video image that interest the user.

The electronic device 100 may implement audio functions such as music playing and recording by using the audio module 170, the speaker 170A, the receiver 170B, the microphone 170C, the headset jack 170D, the application processor, and the like.

The audio module 170 is configured to convert digital audio data into an analog audio electrical signal for output, and is also configured to convert an analog audio electrical signal input into digital audio data. For example, the audio module 170 is configured to convert an analog audio electrical signal output by the microphone 170C into digital audio data.

The audio module 170 may further include an audio processing module. The audio processing module is configured to perform audio processing on digital audio data in the multi-channel video recording mode, to generate audio corresponding to different shooting angles of view. For example, for a wide-angle angle of view, the audio processing module may include a timbre correction module, a stereo beam forming module, a gain control module, and the like. For a zoom angle of view, the audio processing module may include a timbre correction module, a stereo/mono beam forming module, an ambient noise control module, a gain control module, and the like. For a front-facing angle of view, the audio processing module may include a timbre correction module, a stereo/mono beam forming module, a human voice enhancement module, a gain control module, and the like.

The audio module 170 may be further configured to code and decode audio data.

In some embodiments, the audio module 170 may be disposed in the processor 110, or some functional modules in the audio module 170 are disposed in the processor 110.

The speaker 170A, also referred to as a "loudspeaker", is configured to convert an analog audio electrical signal into a sound signal. The electronic device 100 may be used to listen to music or answer a call in a hands-free mode over the speaker 170A. In embodiments of this application, when a multi-channel recorded video is played back, the speaker 170A may be configured to play audio corresponding to different shooting angles of view and video images.

The receiver 170B, also referred to as an "earpiece", is configured to convert an analog audio electrical signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an analog audio electrical signal. When making a call or sending a voice message, a user may make a sound near the microphone 170C through the mouth of the user, to input a sound signal to the microphone 170C. In embodiments of this application, the electronic device 100 may include at least three microphones 170C. The electronic device 100 may implement a function of capturing sound signals in all directions, and converting the captured sound signals into an analog audio electrical signal, and may further implement a noise reduction function, a sound source identification function, a directional recording function, or the like.

Figure 1B:
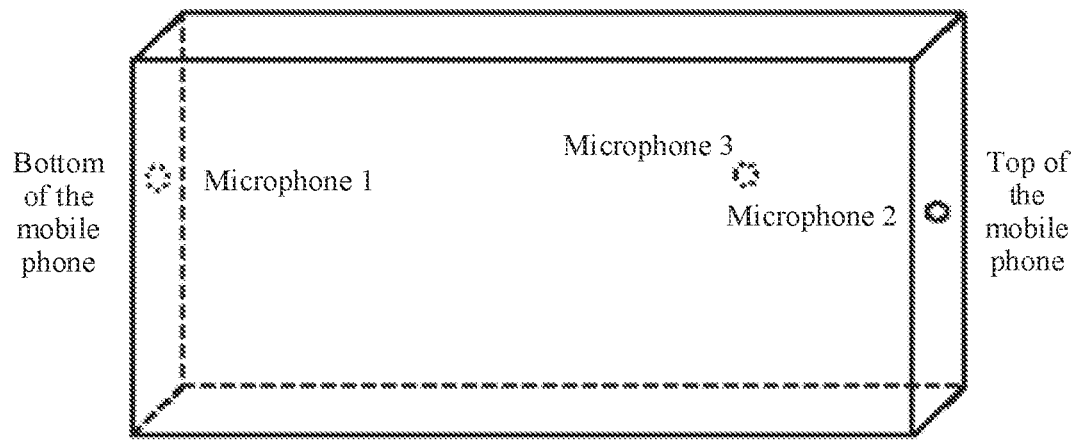
FIG. 1B is a schematic diagram of a layout of microphones according to an embodiment of this application.

For example, a layout of the microphones 170C on the electronic device 100 may be shown in FIG. 1B. The electronic device 100 may include a microphone 1 disposed at the bottom, a microphone 2 disposed at the top, and a microphone 3 disposed at the rear. A combination of the microphones 1 to 3 may collect sound signals in all directions around the electronic device 100.

Figure 1C:
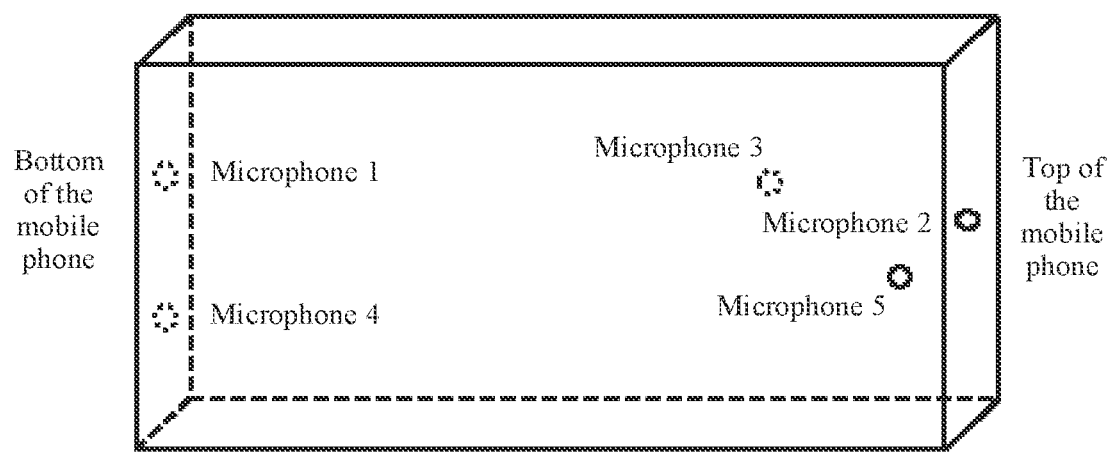
FIG. 1C is a schematic diagram of a layout of microphones according to an embodiment of this application.

For another example, refer to FIG. 1C. The electronic device 100 may further include more microphones 170C. As shown in FIG. 1C, the electronic device 100 may include a microphone 1 and a microphone 4 that are disposed at the bottom, a microphone 2 that is disposed at the top, a microphone 3 that is disposed at the rear, and a microphone 5 that is disposed in the front of the screen. A combination of these microphones may collect sound signals in all directions around the electronic device 100. The screen is the display 194 or a touchscreen.

It should be noted that the microphone 170C may be a built-in component of the electronic device 100, or may be an external accessory of the electronic device 100. For example, the electronic device 100 may include a microphone 1 disposed at the bottom, a microphone 2 disposed at the top, and an external accessory. For example, the external accessory may be a micro microphone connected (in a wired or wireless manner) to the electronic device 100 or a headset with a microphone (for example, a wired headset or a TWS headset).

In some embodiments, the microphone 170C may be a directional microphone, and may capture a sound signal in a specific direction.

The distance sensor 180F is configured to measure a distance. The electronic device 100 may measure the distance in an infrared manner or a laser manner. In some embodiments, in a shooting scenario, the electronic device 100 may measure a distance through the distance sensor 180F to implement quick focusing.

The touch sensor 180K is also referred to as a "touch panel". The touch sensor 180K may be disposed on the display 194, and the touch sensor 180K and the display 194 constitute a "touchscreen". The touch sensor 180K is configured to detect a touch operation performed on or near the touch sensor. The touch sensor may transfer the detected touch operation to the application processor, to determine a type of a touch event. A visual output related to the touch operation may be provided through the display 194. In some other embodiments, the touch sensor 180K may also be disposed on a surface of the electronic device 100 at a location different from that of the display 194.

For example, in embodiments of this application, the electronic device 100 may detect, by using the touch sensor 180K, an operation performed by the user to indicate to start and/or stop shooting.

It may be understood that the structure shown in embodiments of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

In embodiments of this application, in the multi-channel video recording mode, the display 194 may display a shooting preview interface, a video recording preview interface, and a shooting interface during video recording. The camera 193 may be configured to capture a plurality of channels of video images. The plurality of microphones 170C may be configured to capture a sound signal, and generate an analog audio electrical signal. The audio module 170 may convert the analog audio electrical signal into digital audio data, and generate audio corresponding to different shooting angles of view and video images based on the digital audio data. During video playback, the display 194 may display a video play interface. The processor 110 may run the instructions stored in the internal memory 121, to control, based on a selection of the user, the speaker 170A to play audio corresponding to a shooting angle of view and a video image that interest the user, so as to improve audio experience of the user during multi-channel video recording.

A software system of the electronic device 100 may use a layered architecture, an event-driven architecture, a microkernel architecture, a micro service architecture, or a cloud architecture. In embodiments of this application, an Android system with a layered architecture is used as an example to describe a software structure of the electronic device 100.

Figure 2:
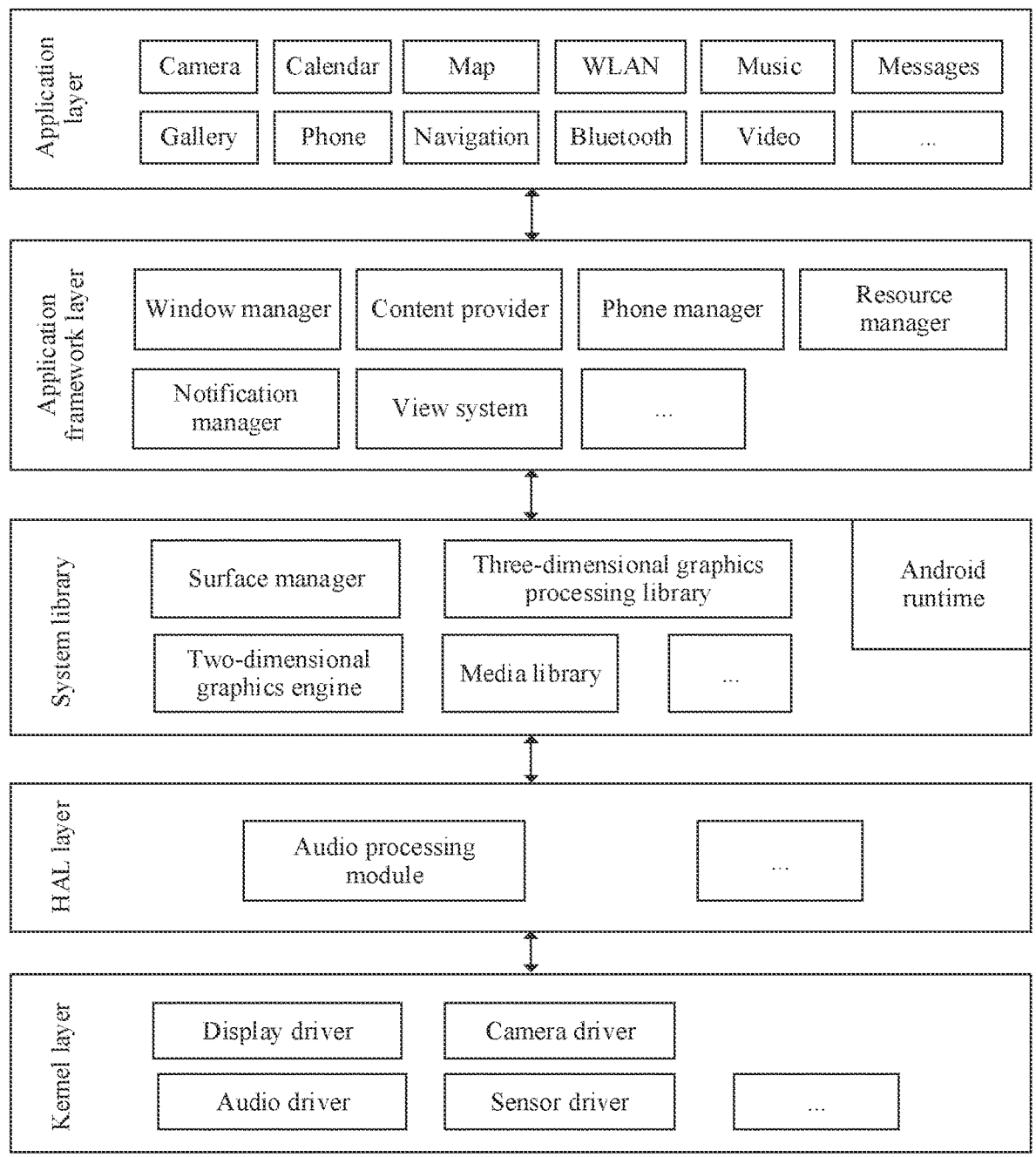
FIG. 2 is a schematic diagram of a software architecture of an electronic device according to an embodiment of this application.

FIG. 2 is a block diagram of the software structure of the electronic device 100 according to an embodiment of this application. In the layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, a hardware abstract layer (hardware abstraction layer, HAL), and a kernel layer from top to bottom. The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, audio, calls that are made and received, a browsing history and a bookmark, a phone book, and the like.

The view system includes visual controls such as a control for displaying a text and a control for displaying an image. The view system may be configured to construct an application program. A display interface may include one or more views. For example, a display interface including a Messages notification icon may include a text display view and an image display view.

The phone manager is configured to provide a communications function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification type message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The core library includes two parts: a function that needs to be invoked in java language, and a core library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of audio and video in a plurality of commonly used formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The HAL layer is an interface layer located between an operating system kernel and a hardware circuit, and may abstract hardware. The HAL layer includes an audio processing module. The audio processing module may be configured to process, based on a shooting angle of view, an analog audio electrical signal obtained by the microphone, to generate audio corresponding to different shooting angles of view and video images. For example, for a wide-angle angle of view, the audio processing module may include a timbre correction module, a stereo beam forming module, a gain control module, and the like. For a zoom angle of view, the audio processing module may include a timbre correction module, a stereo/mono beam forming module, an ambient noise control module, a gain control module, and the like. For a front-facing angle of view, the audio processing module may include a timbre correction module, a stereo/mono beam forming module, a human voice enhancement module, a gain control module, and the like.

The kernel layer is a layer between the hardware layer and the foregoing software layer. The kernel layer includes at least a display driver, a camera driver, an audio driver, and a sensor driver. The hardware layer may include a camera, a display, a microphone, a processor, a memory, and the like.

In embodiments of this application, in the multi-channel video recording mode, the display at the hardware layer may display a shooting preview interface, a video recording preview interface, and a shooting interface during video recording. The camera at the hardware layer may be configured to capture a plurality of channels of video images. The microphones at the hardware layer may be configured to capture a sound signal, and generate an analog audio electrical signal. The audio processing module at the HAL layer may be configured to process digital audio data converted from an analog audio electrical signal, to generate audio corresponding to different shooting angles of view and video images. During video playback, the display may display a video play interface, and a speaker may play audio corresponding to a shooting angle of view and a video image that a user pays attention to, to improve audio experience of the user during multi-channel video recording.

Figure 3:
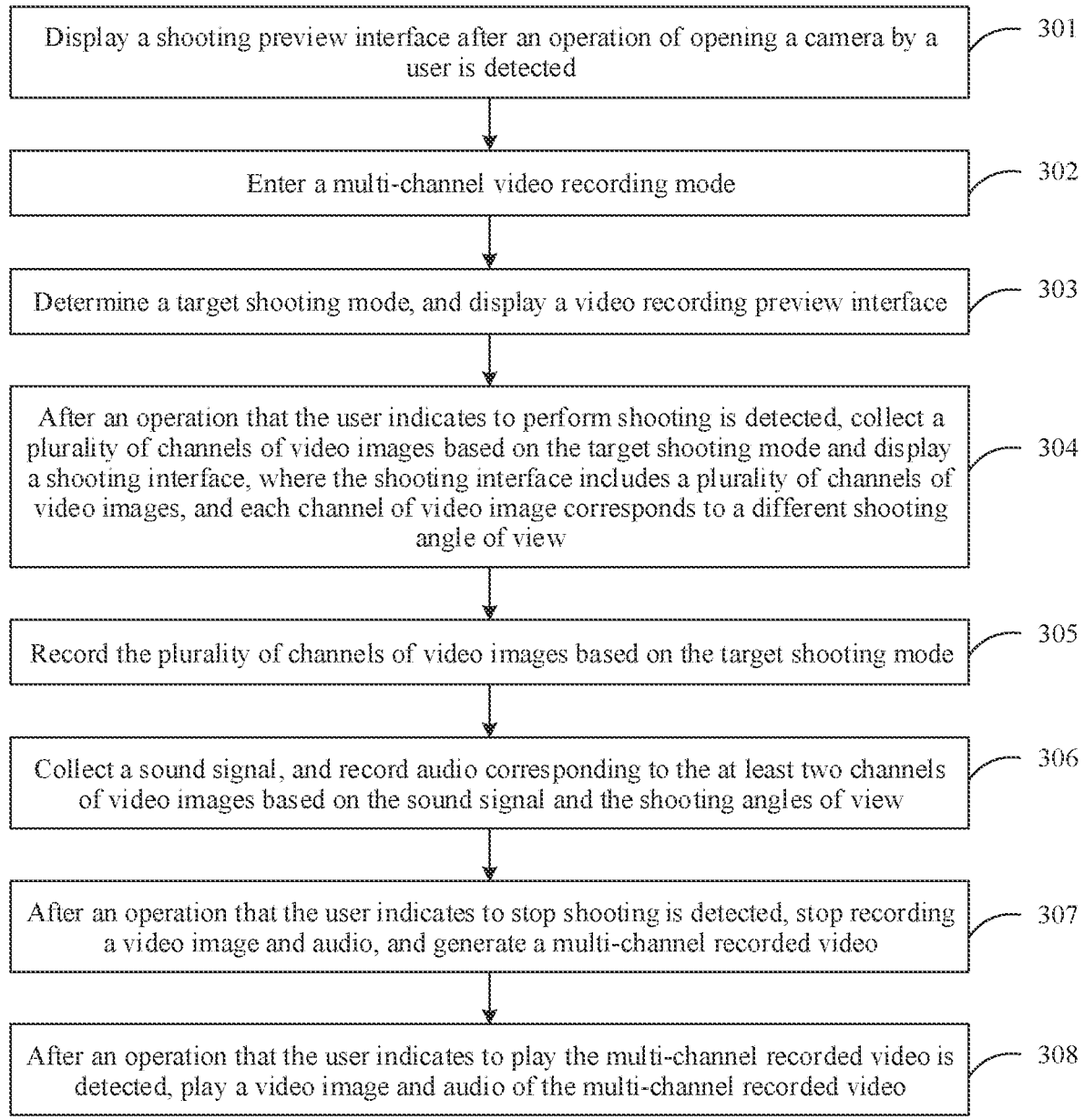
FIG. 3 is a flowchart of audio processing according to an embodiment of this application.

The following describes the audio processing method provided in embodiments of this application by using an example in which the electronic device is a mobile phone having a structure shown in FIG. 1A and the mobile phone includes three or more microphones. Refer to FIG. 3. The method may include the following steps.

301: The mobile phone displays a shooting preview interface after detecting an operation of opening a camera by a user.

After detecting the operation of opening the camera (which may also be referred to as a camera application below) by the user, the mobile phone starts the camera application, and displays the shooting preview interface. There may be a plurality of types of operations of opening the camera by the user. For example, after detecting an operation of tapping a camera icon 401 shown in FIG. 4(*a*) by the user, the mobile phone starts the camera application and displays a shooting preview interface shown in FIG. 4(*b*).

For another example, after detecting an operation that the user indicates to open the camera by using a voice, the mobile phone starts the camera application and displays a shooting preview interface shown in FIG. 4(*b*).

302: The mobile phone enters a multi-channel video recording mode.

After starting the camera application and displaying the shooting preview interface, the mobile phone may enter the multi-channel video recording mode, to display a video recording preview interface.

The mobile phone may enter the multi-channel video recording mode in a plurality of manners. For example, in some implementations, after starting the camera application, the mobile phone enters a non-multi-channel video recording mode by default, for example, a photo mode or a video recording mode (namely, a single-channel video recording mode). The mobile phone enters the multi-channel video recording mode after detecting a preset operation 1 that the user indicates to enter the multi-channel video recording mode. For example, the preset operation 1 may be an operation of tapping a control 402 shown in FIG. 4(*b*) by the user to enter the multi-channel video recording mode.

In some other implementations, in the non-multi-channel video recording mode such as the photo mode or the video recording mode (namely, the single-channel video recording mode), the mobile phone enters the multi-channel video recording mode after detecting an operation of drawing a preset track 1 (for example, a track "M") on a touchscreen by the user.

In some other implementations, in the video recording mode (namely, the single-channel video recording mode), the mobile phone may prompt, on the video recording preview interface, the user whether to enter the multi-channel video recording mode. The mobile phone may enter the multi-channel video recording mode based on an indication of the user.

In some other implementations, after starting the camera application, the mobile phone enters the multi-channel video recording mode by default.

In some other embodiments, the mobile phone may directly perform step 302 without performing step 301, to directly enter the multi-channel video recording mode. For example, when the screen is on and a home screen is displayed, or when the screen is off, if the mobile phone detects an operation of drawing a preset track (for example, a track "CM") on the touchscreen by the user, the mobile phone starts the camera application and directly enters the multi-channel video recording mode.

As described above, in Case 1, in the multi-channel video recording mode, a shooting angle of view corresponding to each channel of video is fixed. The following first uses Case 1 as an example for description.

303: The mobile phone determines a target shooting mode, and displays a video recording preview interface based on the target shooting mode.

There may be a plurality of shooting modes in the multi-channel video recording mode, and each shooting mode may correspond to a combination of different shooting angles of view. For example, for examples of the shooting modes in the multi-channel video recording mode, refer Table 1. The mobile phone may determine the target shooting mode in the multi-channel video recording mode, to display the video recording preview interface based on the target shooting mode.

Figure 4A:
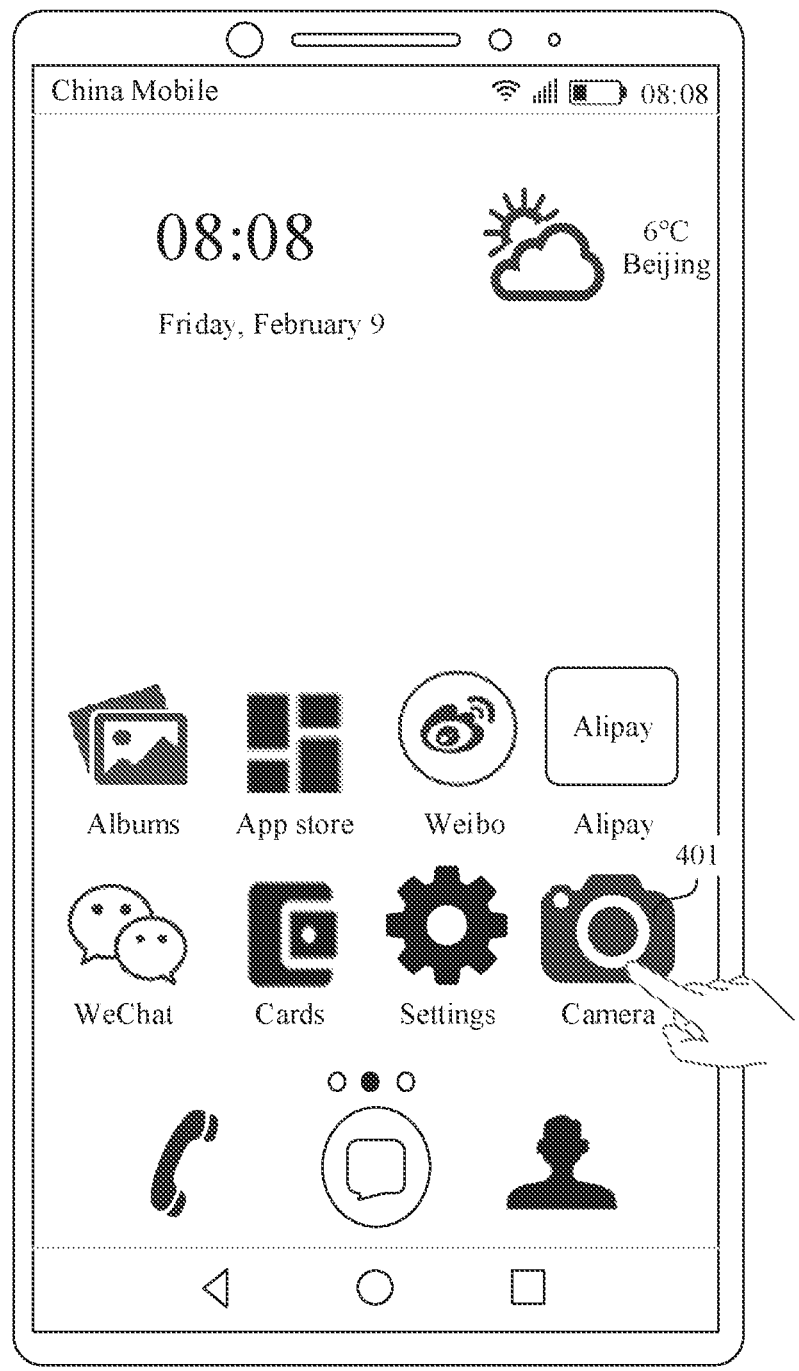
FIG. 4(a) to FIG. 4(d) are a schematic diagram of a group of interfaces according to an embodiment of this application.
Figure 4B:
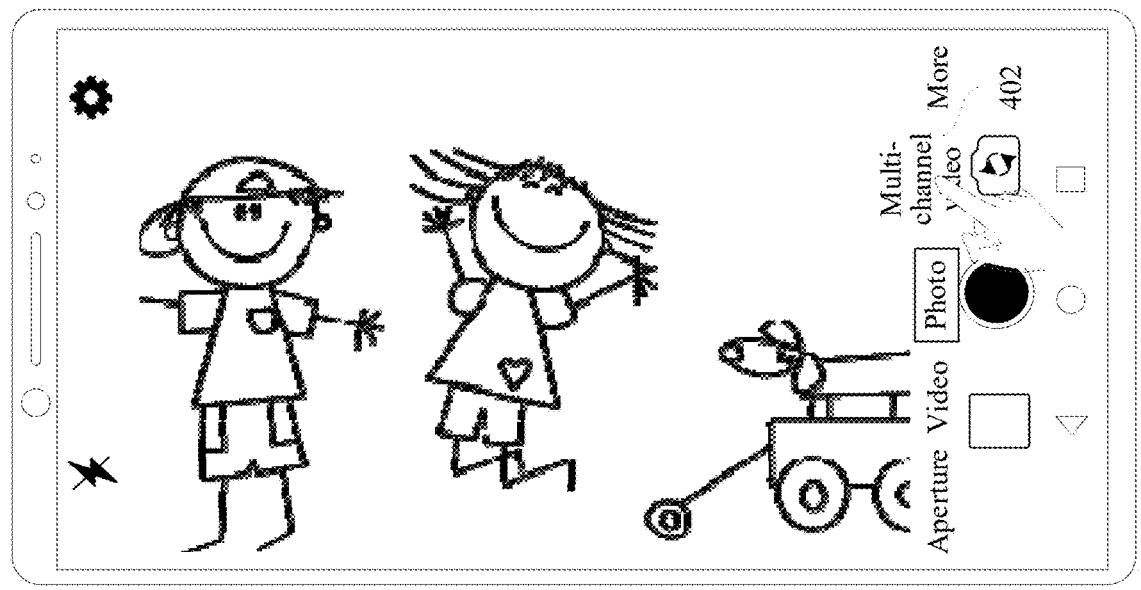
Figure 4C:
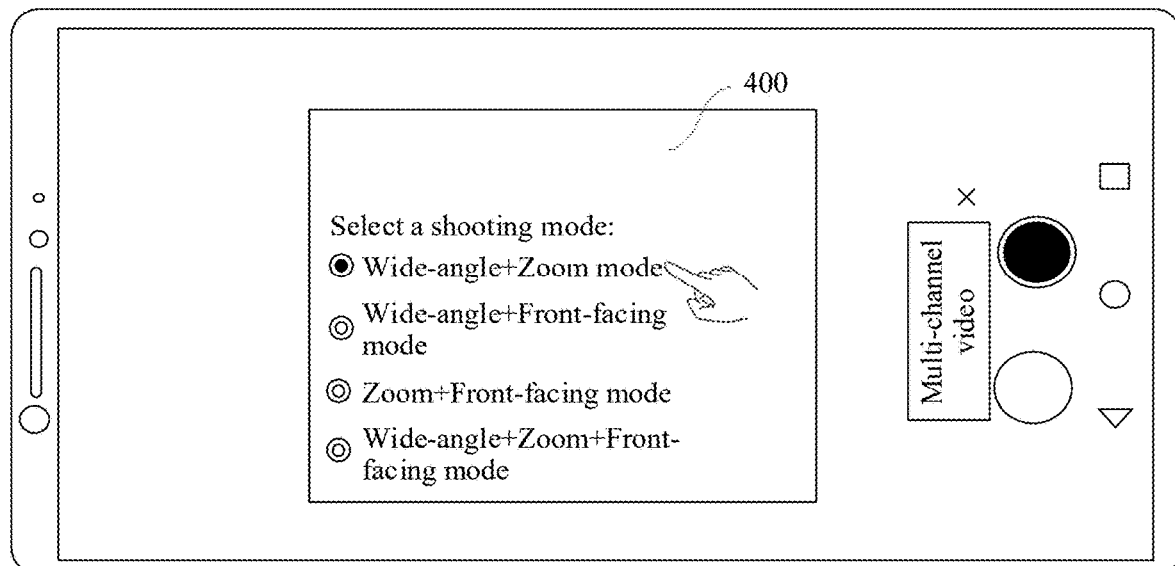
Figure 4D:
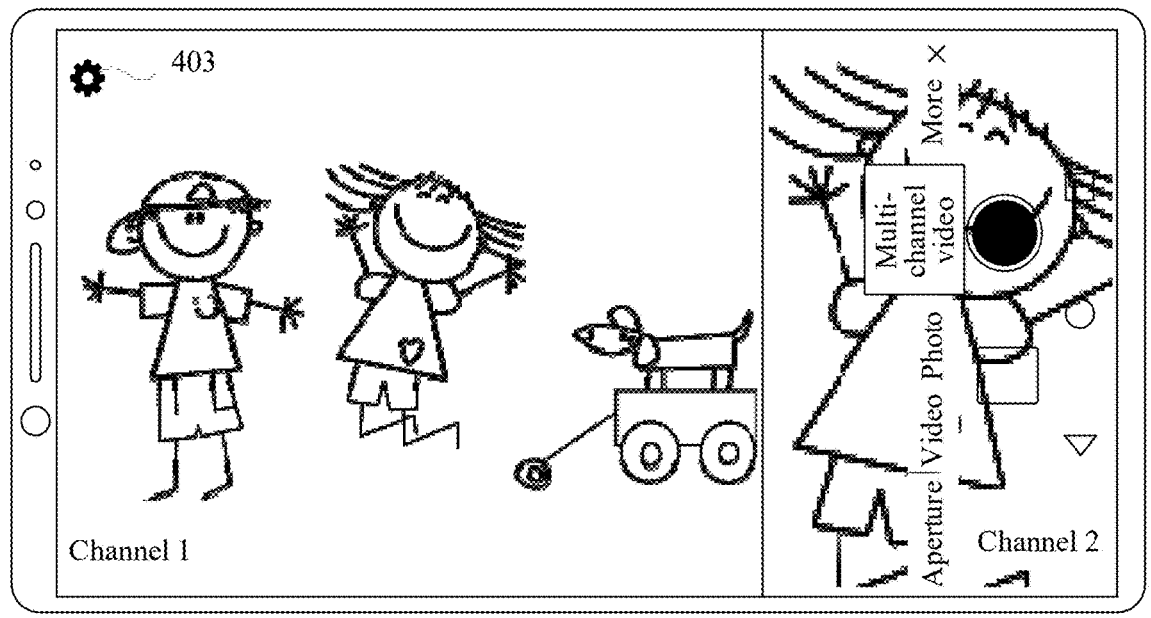

In some implementations, the target shooting mode may be a preset shooting mode. For example, when the preset shooting mode is the shooting mode 1 shown in Table 1, for a video recording preview interface displayed by the mobile phone, refer to FIG. 4(d). As shown in FIG. 4(d), the shooting mode 1 includes a channel 1 on the left and a channel 2 on the right. The channel 1 corresponds to a wide-angle angle of view, and the channel 2 corresponds to a zoom angle of view.

In some other implementations, the target shooting mode may be a shooting mode that is recorded by the mobile phone and that is used last time, or a shooting mode that is preset by the user by using a setting interface of the mobile phone before the mobile phone enters the multi-channel video recording mode.

In some other implementations, the target shooting mode may be a shooting mode indicated by the user after the mobile phone enters the multi-channel video recording mode. For example, after entering the multi-channel video recording mode, the mobile phone may prompt the user to select the target shooting mode. For example, refer to FIG. 4(c). After entering the multi-channel video recording mode, the mobile phone may display a prompt box 400 to prompt the user to select the target shooting mode. The prompt box 400 may include the following plurality of shooting modes: a wide-angle+zoom mode, a wide-angle+front-facing mode, a zoom+front-facing mode, and a wide-angle+zoom+front-facing mode. After detecting an operation of selecting a shooting mode by the user, the mobile phone determines the shooting mode as the target shooting mode. For example, after detecting an operation of selecting a shooting mode of the wide-angle+zoom mode by the user, the mobile phone determines that the target shooting mode is the shooting mode 1, to display the video recording preview interface corresponding to the shooting mode 1 shown in FIG. 4(d).

In some other implementations, after the mobile phone enters the multi-channel video recording mode, the target shooting mode is the preset shooting mode by default, and then the mobile phone may switch the target shooting mode based on an indication of the user.

For example, the preset shooting mode is the shooting mode 1. After the mobile phone enters the multi-channel video recording mode, the video recording preview interface displayed by the mobile phone includes a video image at a wide-angle angle of view on the channel 1 and a video image at a zoom angle of view on the channel 2. The mobile phone may display the prompt box 400 on the video recording preview interface, so that the user selects a new target shooting mode. Alternatively, the mobile phone may display a shooting mode option in the multi-channel video recording mode on the video recording preview interface, so that the user selects a new target shooting mode. For example, refer to FIG. 5(a). After detecting an operation of tapping a control 501 by the user, the mobile phone determines that the target shooting mode is switched to a shooting mode 2. Then, the mobile phone may display a video recording preview interface corresponding to the shooting mode 2.

For another example, the preset shooting mode is the shooting mode 1. After entering the multi-channel video recording mode, the mobile phone displays the video recording preview interface corresponding to the shooting mode 1. The mobile phone may further display an option of a shooting angle of view in the multi-channel video recording mode, and the mobile phone may determine a new target shooting mode based on a plurality of shooting angles of view selected by the user. Each shooting angle of view corresponds to one channel of video image. For example, refer to FIG. 5(b). After detecting an operation of tapping a control 502 and a control 503 by the user, the mobile phone determines that the shooting angle of view includes the wide-angle angle of view and the front-facing angle of view, to determine that the new target shooting mode is the shooting mode 2. Then, the mobile phone may display the video recording preview interface corresponding to the shooting mode 2.

For another example, different cameras may correspond to different shooting angles of view. For example, a wide-angle camera may correspond to the wide-angle angle of view, a long-focus camera may correspond to the zoom angle of view, and a front-facing camera may correspond to the front-facing angle of view. The preset shooting mode is the shooting mode 1. After entering the multi-channel video recording mode, the mobile phone displays the video recording preview interface corresponding to the shooting mode 1. The mobile phone may further display an identifier of each camera. After detecting an operation of selecting a plurality of cameras by the user, the mobile phone may determine a shooting angle of view corresponding to each camera, to determine a new target shooting mode based on shooting angles of view. Each shooting angle of view corresponds to one channel of video image. For example, refer to FIG. 5(c). The mobile phone displays a wide-angle camera identifier 504, a long-focus camera identifier 505, and a front-facing camera identifier 506. After detecting that the user taps the wide-angle camera identifier 504 and the front-facing camera identifier 506, the mobile phone determines that the target shooting mode is the shooting mode 2 shown in Table 1. Then, the mobile phone may display the video recording preview interface corresponding to the shooting mode 2.

Figure 5A:
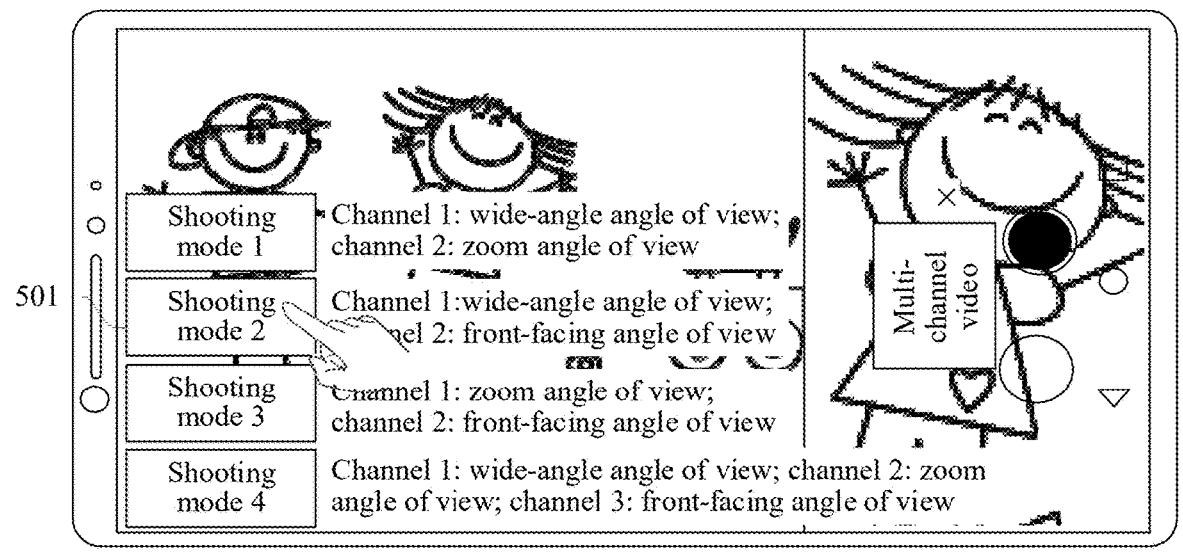
FIG. 5(a) to FIG. 5(c) are a schematic diagram of another group of interfaces according to an embodiment of this application.
Figure 5B:
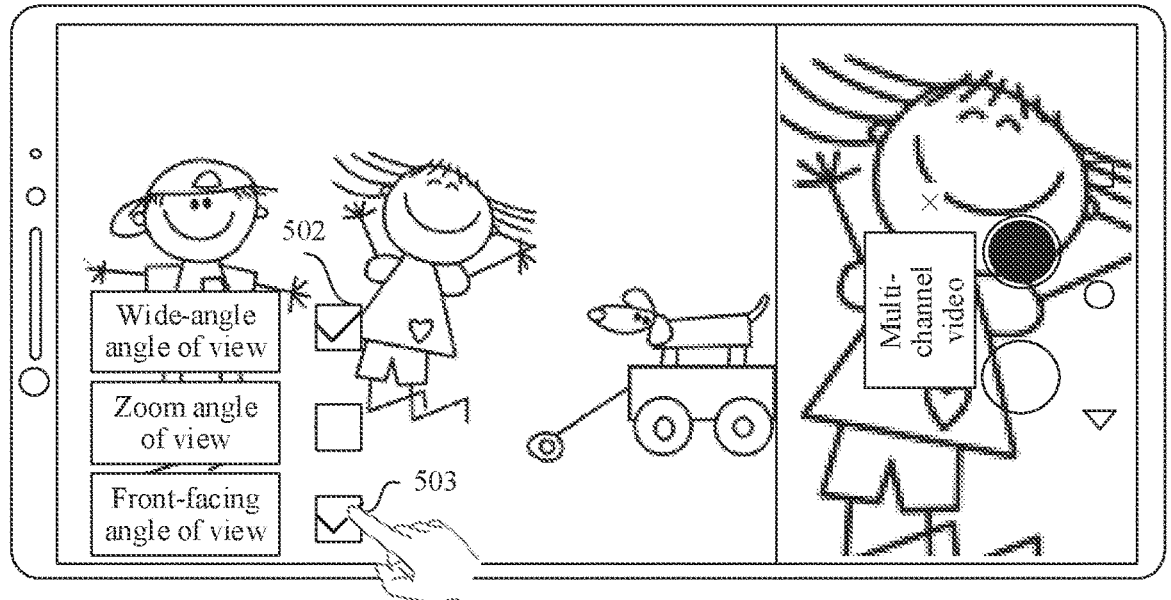
Figure 5C:
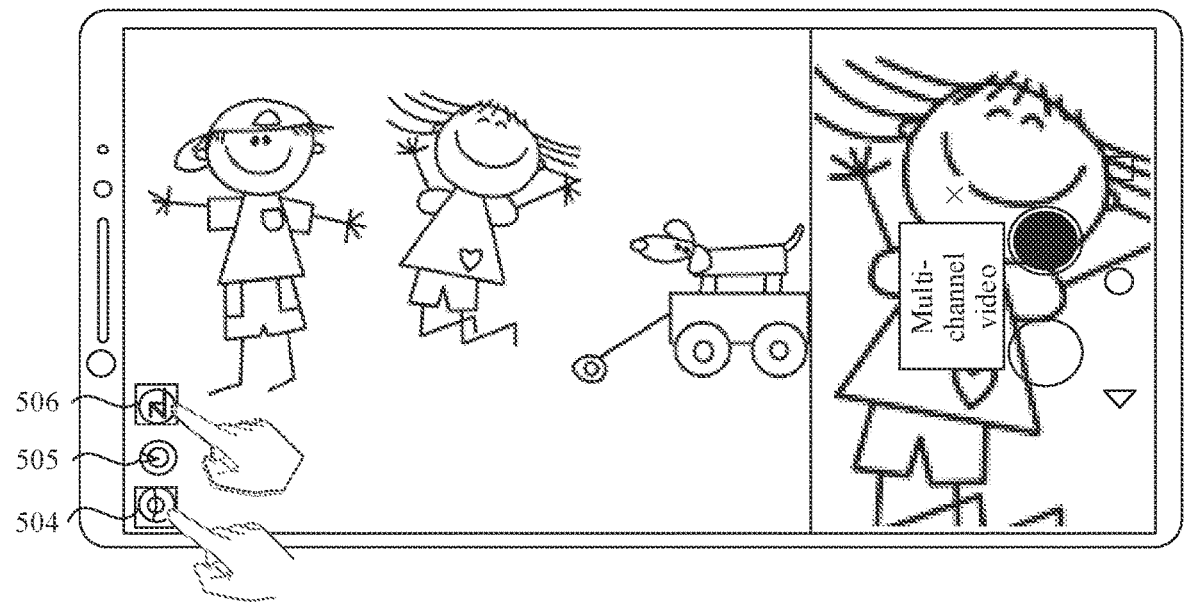

For another example, the preset shooting mode is the shooting mode 1. After entering the multi-channel video recording mode, the mobile phone displays the video recording preview interface corresponding to the shooting mode 1. After detecting that the user taps a control 403 shown in FIG. 4(d), the mobile phone may display a shooting setting interface. In response to an operation of the user on the shooting setting interface, the mobile phone displays an interface that is used to set the target shooting mode and that is shown in FIG. 5(a), FIG. 5(b), FIG. 5(c), or the like.

For another example, the preset shooting mode is the shooting mode 1. After entering the multi-channel video recording mode, the mobile phone displays the video recording preview interface corresponding to the shooting mode 1. The video recording preview interface may further include a control (for example, a shooting mode control) used to set the target shooting mode. After detecting that the user taps the control, the mobile phone may display an interface that is used to set the target shooting mode and that is shown in FIG. 5(a), FIG. 5(b), FIG. 5(c), or the like.

In some embodiments, the mobile phone may further perform front-facing/rear-facing switching based on an indication of the user, and switch the target shooting mode. For example, refer to (a) in FIG. 6. The target shooting mode is the shooting mode 1 in Table 1, the shooting mode 1 includes a channel 1 and a channel 2, the channel 1 corresponds to the wide-angle angle of view, and the channel 2 corresponds to the zoom angle of view. Refer to (b) in FIG. 6. After the mobile phone detects an operation of tapping a switching control 600 by the user, the target shooting mode is switched to the shooting mode 2 in Table 1. The shooting mode 2 includes a channel 1 and a channel 2, the channel 1 corresponds to the wide-angle angle of view, and the channel 2 corresponds to the front-facing angle of view.

Figure 6:
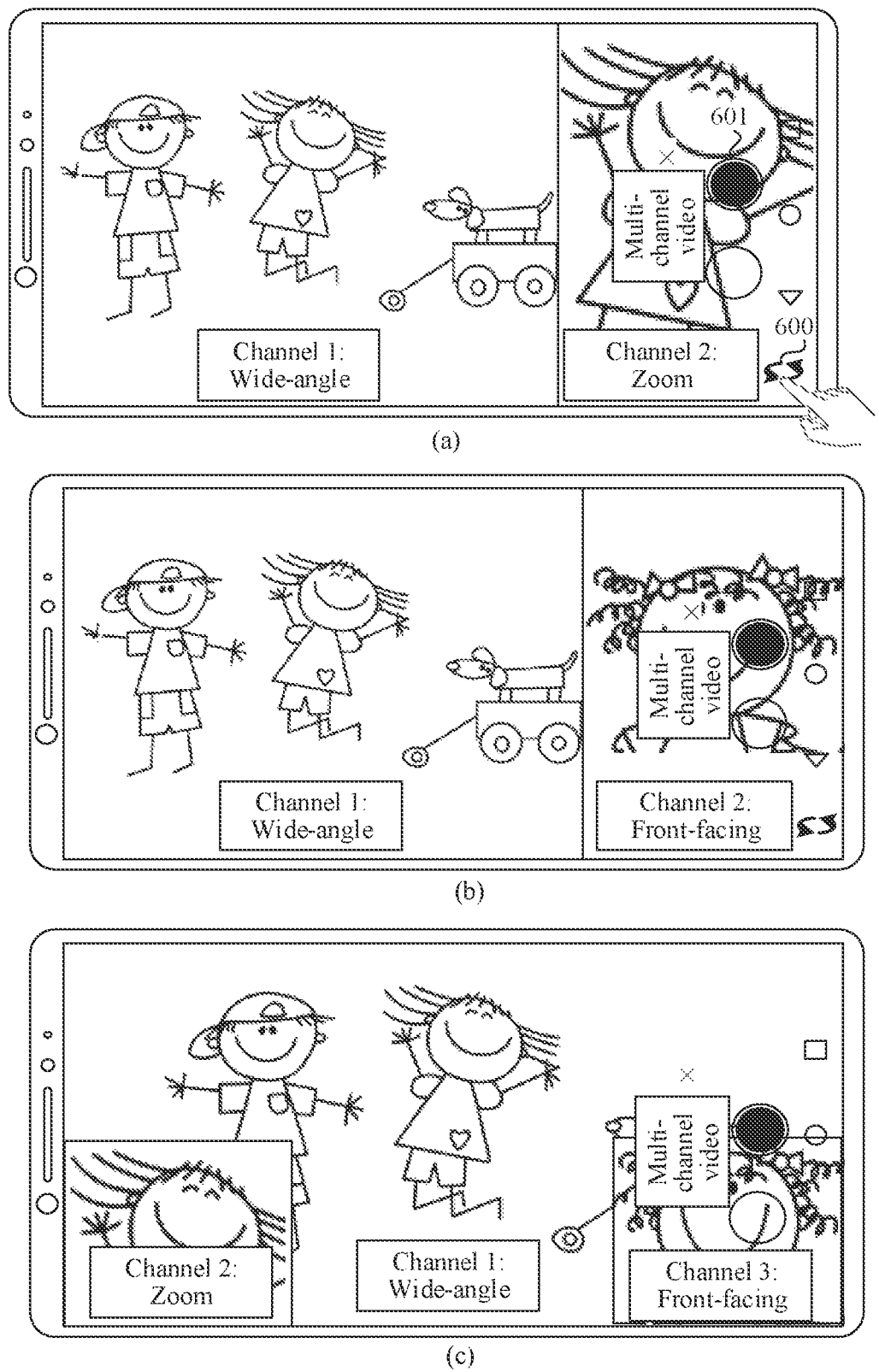
FIG. 6 is a schematic diagram of another group of interfaces according to an embodiment of this application.

In addition, for example, when the target shooting mode is the shooting mode 4 in Table 1, for a video recording preview interface, refer to (c) in FIG. 6. The video recording preview interface includes a channel 1 to a channel 3, the channel 1 corresponds to the wide-angle angle of view, the channel 2 corresponds to the zoom angle of view, and the channel 3 corresponds to the front-facing angle of view.

304: After detecting an operation that the user indicates to perform shooting, the mobile phone collects a plurality of channels of video images based on the target shooting mode and displays a shooting interface, where the shooting interface includes a plurality of channels of video images, and each channel of video image corresponds to a different shooting angle of view.

For example, the operation that the user indicates to perform shooting may be an operation of tapping a shooting control 601 shown in (a) in FIG. 6, a user voice indication operation, or another operation. This is not limited in this embodiment of this application. After detecting the operation that the user indicates to perform shooting, the mobile phone may display a corresponding shooting interface based on a channel status and shooting angles of view that correspond to the target shooting mode. The shooting interface includes a plurality of channels of video images, and each channel of video image corresponds to a different shooting angle of view.

There may be a plurality of layout formats of the plurality of channels of video images on the shooting interface, for example, a left-right splicing format, a left-middle-right splicing format, an up-down splicing format, an up-middle-down splicing format, or a picture-in-picture format.

For example, the target shooting mode is the shooting mode 2 shown in Table 1. For the plurality of channels of video images on the shooting interface, refer to (a) in FIG. 7. The plurality of channels of video images shown in (a) in FIG. 7 use the left-right splicing format, a left image is a video image corresponding to the wide-angle angle of view, and a right image is a video image corresponding to the front-facing angle of view.

For another example, the target shooting mode is the shooting mode 4 in Table 1. For the plurality of channels of video images on the shooting interface, refer to (b) in FIG. 7. The plurality of channels of video images shown in (b) in FIG. 7 use the picture-in-picture format, a small image in a lower left corner is a video image corresponding to the zoom angle of view, a small image in a lower right corner is a video image corresponding to the front-facing angle of view, and a large image in the middle is a video image corresponding to the wide-angle angle of view.

In some embodiments, in a multi-channel video recording process, the target shooting mode may also be switched. For example, after the mobile phone detects that the user taps a front-facing/rear-facing switching control 703 in (a) in FIG. 7, the channel 2 may be switched from the front-facing angle of view to the zoom angle of view, and the target shooting mode may be switched from the shooting mode 2 to the shooting mode 1.

It should be noted that, in Case 1, a zoom ratio corresponding to each channel of video image may change based on an indication of the user. In addition, the zoom ratio corresponding to each channel of video image may change within a zoom ratio range of a zoom angle of view corresponding to the channel. For example, a zoom ratio range of the wide-angle angle of view is a range less than a preset value K. A zoom ratio of a channel of video image corresponding to the wide-angle angle of view may change within the range less than the preset value K.

305: The mobile phone records the plurality of channels of video images based on the target shooting mode.

The mobile phone may record the plurality of channels of video images based on the channel status and the shooting angles of view that correspond to the target shooting mode. The recording process may include: The mobile phone performs processing such as video encoding on the plurality of collected channels of video images, to generate and store a video file.

In some embodiments, the plurality of channels of video images correspond to a same video file. In some other embodiments, each channel of video image corresponds to a video file. In this way, during subsequent video playback, the mobile phone may separately play one channel of video image.

After the mobile phone detects the operation that the user indicates to perform shooting, the method may further include step 306.

306: The mobile phone collects a sound signal, and records audio corresponding to the at least two channels of video images based on the sound signal and the shooting angles of view.

There are two solutions for the mobile phone to record the audio corresponding to the at least two channels of video images:

Solution 1: The mobile phone records audio corresponding to each of the plurality of channels of video images. In other words, the mobile phone records N channels of video images and N channels of audio, where N is a positive integer greater than 1. That is, the mobile phone may record the audio corresponding to each of the plurality of channels of video images based on the shooting angle of view corresponding to each channel of video image. That is, the mobile phone records audio corresponding to a first channel of video image based on a shooting angle of view corresponding to the first channel of video image, and the mobile phone records audio corresponding to a second channel of video image based on a shooting angle of view corresponding to the second channel of video image.

Solution 2: The mobile phone records audio corresponding to a part of the plurality of channels of video images. In other words, the mobile phone records N channels of video images and M channels of audio, where N is greater than M, and both N and M are positive integers greater than 1. In other words, in Solution 1 and Solution 2, the mobile phone records a plurality of channels of audio based on the sound signal and the shooting angles of view.

The following first describes a case described in Solution 1.

In Case 1, each channel of video image corresponds to a different shooting angle of view, and the mobile phone records audio corresponding to each channel of video image, that is, records audio corresponding to video images at different shooting angles of view.

Figure 8:
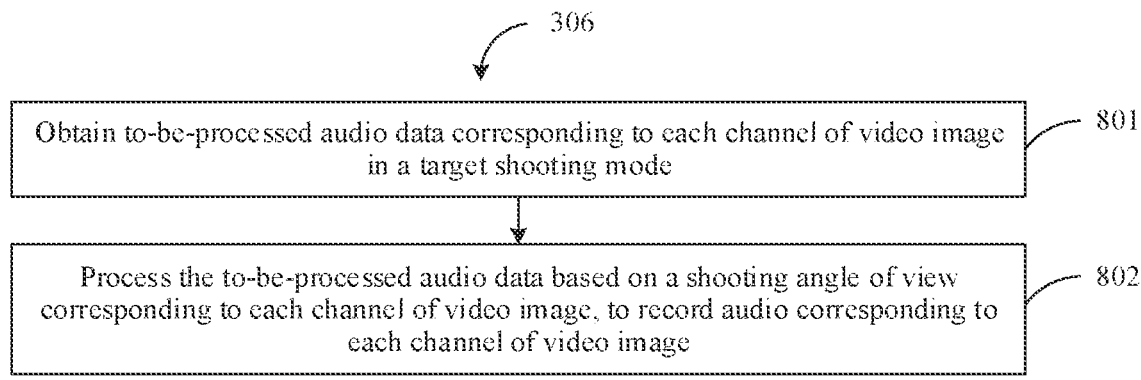
FIG. 8 is a flowchart of audio recording according to an embodiment of this application.

In Solution 1, refer to FIG. 8. Step 306 may include the following steps.

801: The mobile phone obtains to-be-processed audio data corresponding to each channel of video image in the target shooting mode.

In some embodiments, each microphone of the mobile phone may be turned on to collect a sound signal, and each microphone may convert the sound signal into an analog audio electrical signal. An audio module in the mobile phone may convert the analog audio electrical signal into initial audio data. A combination of initial audio data corresponding to the microphones may include sound information in all directions.

In some technical solutions, because the combination of initial audio data corresponding to the microphones may include sound information in all directions, the mobile phone may obtain to-be-processed audio data corresponding to different shooting angles of view based on the sound information in all directions. For example, the mobile phone weights the initial audio data corresponding to the microphones according to preset weighting policies corresponding to different shooting angles of view, to obtain to-be-processed audio data corresponding to the different shooting angles of view, that is, obtain to-be-processed audio data corresponding to different channels of video images.

In some other technical solutions, the to-be-processed audio data corresponding to each channel of video image in the target shooting mode is audio data obtained after the initial audio data corresponding to the microphones is fused, and the fused audio data includes sound information in all directions.

In some other technical solutions, the to-be-processed audio data corresponding to each channel of video image in the target shooting mode is audio data obtained after the initial audio data corresponding to the microphones is fused. Subsequently, in a beam forming module or other audio processing module, the mobile phone weights the audio data corresponding to the microphones according to preset weight policies corresponding to different shooting angles of view, to obtain audio data corresponding to the different shooting angles of view.

In some other embodiments, the mobile phone may use different microphone combinations to obtain to-be-processed audio data corresponding to different shooting angles of view. For example, in a scenario shown in FIG. 1C, to-be-processed audio data corresponding to the wide-angle angle of view may be audio data obtained after initial audio data of the microphone 1 and the microphone 2 is weighted. To-be-processed audio data corresponding to the zoom angle of view may be audio data obtained after initial audio data of the microphone 1, the microphone 2, and the microphone 3 is weighted. To-be-processed audio data corresponding to the front-facing angle of view may be audio data obtained after initial audio data of the microphone 1, the microphone 2, and the microphone 5 is weighted.

In addition, the mobile phone may further weight initial audio data corresponding to different microphones to generate different types of to-be-processed audio data such as to-be-processed left-channel audio data, to-be-processed right-channel audio data, to-be-processed stereo audio data, or to-be-processed mono audio data. Different weighting policies may be used for different types of to-be-processed audio data.

802: The mobile phone processes the to-be-processed audio data based on the shooting angle of view corresponding to each channel of video image, to record audio corresponding to each channel of video image.

The audio processing module in the mobile phone may perform audio processing on the initial audio data according to audio processing solutions corresponding to different shooting angles of view, to generate the audio corresponding to each shooting angle of view in the target shooting mode, that is, generate the audio corresponding to each channel of video image in the target shooting mode.

The following separately describes audio processing solutions corresponding to different shooting angles of view.

(1) Wide-Angle Angle of View

At the wide-angle angle of view, if the user wants to record a video image within a relatively large range, the mobile phone may record a video image within the relatively large range, for example, may record a panoramic video image. Correspondingly, at the wide-angle angle of view, the user also wants to obtain a sound within the relatively large range. Therefore, at the wide-angle angle of view, the mobile phone may record a sound within the relatively large range, for example, may record a panoramic sound.

Figure 9:
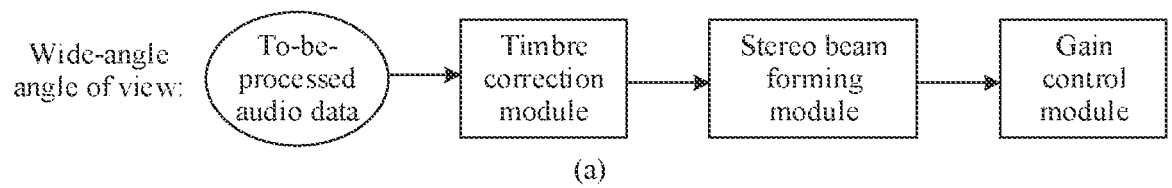
FIG. 9 is a schematic diagram of an audio processing solution and an audio beam according to an embodiment of this application.
Figure 9:
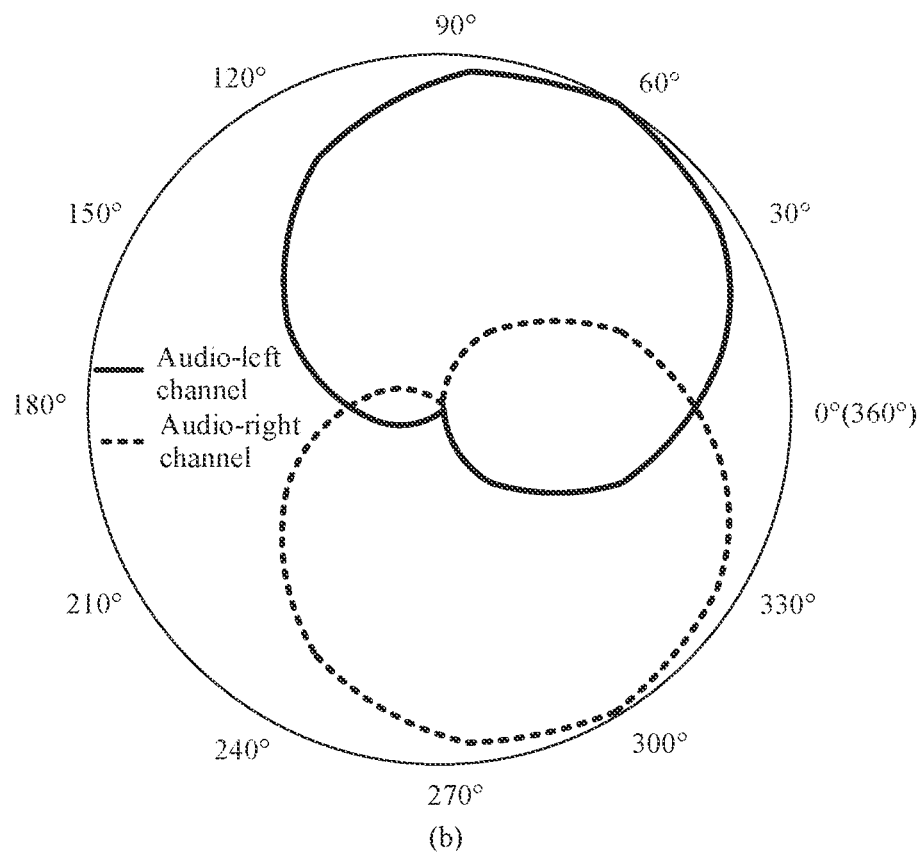

For example, for an audio processing solution corresponding to the wide-angle angle of view, refer to (a) in FIG. 9. As shown in (a) in FIG. 9, the to-be-processed audio data separately passes through a timbre correction module, a stereo beam forming module, a gain control module, and the like.

The timbre correction module may perform timbre correction processing, to correct a frequency response change generated in a process of a sound wave from a microphone hole to analog/digital conversion, for example, factors such as uneven frequency response of a microphone body, a resonance effect of a microphone pipe, and a filter circuit.

The stereo beam forming module is configured to form a stereo beam, so as to retain an audio signal within a coverage range of the stereo beam. For audio at the wide-angle angle of view, a sound within a relatively large range needs to be picked up, and a mono beam usually cannot cover a relatively large range. Therefore, a stereo beam may be used to retain an audio signal within a relatively large coverage range. In addition, an included angle between a left-channel beam and a right-channel beam in the stereo beam may be controlled within a relatively large angle range, so that the combined stereo beam can cover a relatively large range. The included angle between the left-channel beam and the right-channel beam is an included angle between a tangent that passes through a first tangent point and a tangent that passes through a second tangent point. The first tangent point is a tangent point between the left-channel beam and a circular boundary, and the second tangent point is a tangent point between the right-channel beam and the circular boundary. For example, an included angle of the stereo beam may be controlled within 120 degrees to 180 degrees, and the stereo beam may cover a 360-degree panoramic direction. For example, for a schematic diagram of the stereo beam, refer to (b) in FIG. 9. A solid-line beam represents the left-channel beam, a dashed-line beam represents the right-channel beam, and a 0-degree direction is aligned with a rear-facing camera direction. The rear-facing camera direction is a direction perpendicular to a surface of the mobile phone at the rear of the mobile phone and a perpendicular foot is a camera.

The gain control module may perform gain control processing, and is configured to adjust recording volume to appropriate volume, so that a low-volume signal obtained through pickup can be clearly heard by the user, and a high-volume signal obtained through pickup does not have clipping distortion. The mobile phone generates an audio file corresponding to the wide-angle angle of view based on audio data obtained after the audio processing, to record and obtain the audio corresponding to the wide-angle angle of view.

(2) Zoom Angle of View

At the zoom angle of view, if the user wants to record a video image within a zoom range, the mobile phone may record a video image within the zoom range. Correspondingly, at the zoom angle of view, the user also wants to obtain a sound within the zoom range. Therefore, at the zoom angle of view, the mobile phone may record a sound within the zoom range, and suppress a sound in another direction.

Figure 10:
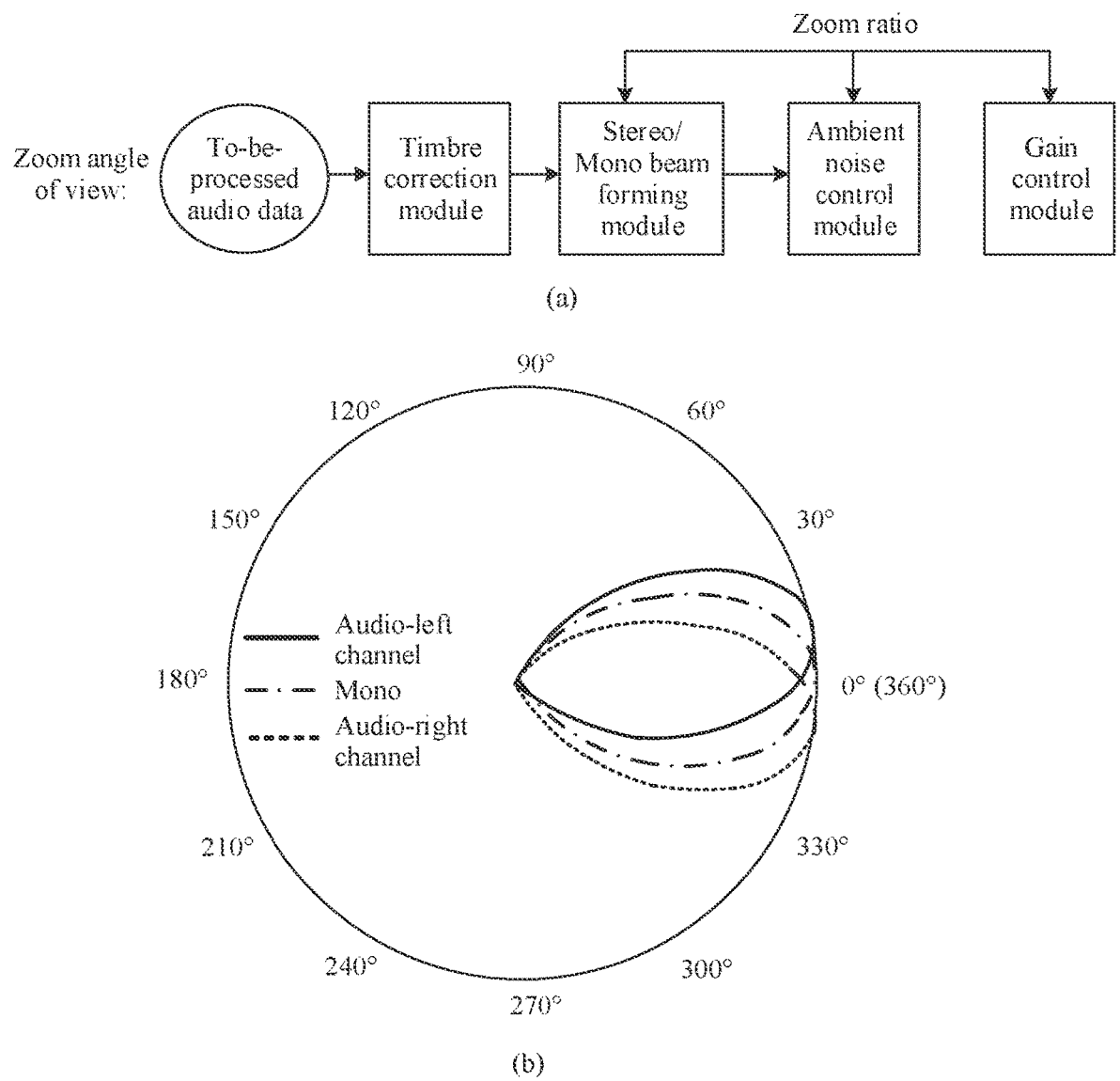
FIG. 10 is a schematic diagram of another audio processing solution and another audio beam according to an embodiment of this application.

For example, for an audio processing solution corresponding to the zoom angle of view, refer to (a) in FIG. 10. As shown in (a) in FIG. 10, the to-be-processed audio data separately passes through a timbre correction module, a stereo/mono beam forming module, an ambient noise control module, a gain control module, and the like. A function of the timbre correction module is similar to a function of the module at the wide-angle angle of view. The stereo/mono beam forming module is configured to form a stereo beam or a mono beam, so as to retain an audio signal within a coverage range of the stereo beam or the mono beam. A sound within the zoom range needs to be picked up at the zoom angle of view, and the zoom range is smaller than a sound pickup range at the wide-angle angle of view. Therefore, a stereo beam or a mono beam may be used at the zoom angle of view. In comparison with the wide-angle angle of view, the stereo/mono beam module may narrow the mono beam based on a zoom ratio, or narrow an included angle of the stereo beam. A beam gain of the stereo/mono beam within the zoom range is relatively large, so that a sound within the zoom range can be retained, and a sound beyond the zoom range can be suppressed, to highlight the sound within the zoom range. For example, (b) in FIG. 10 is a schematic diagram of a stereo beam when a zoom ratio is s, where s is greater than the preset value K. A solid-line beam represents a left-channel beam, a dashed-line beam represents a right-channel beam, and a 0-degree direction is aligned with a rear-facing camera direction. The ambient noise suppression module may perform ambient noise suppression processing, to suppress ambient noise that is not obviously directional, so as to increase a signal-to-noise ratio of the sound within the zoom range, so that the sound within the zoom range is more highlighted. In addition, noise reduction strength of the ambient noise suppression module on ambient noise also increases with an increase of a zoom ratio. In this way, a larger zoom ratio indicates weaker ambient noise. A function of the gain control module is similar to a function of the module at the wide-angle angle of view. A difference lies in that a volume gain of the sound within the zoom range increases with an increase of the zoom ratio. In this way, a larger zoom ratio indicates a louder sound within the zoom range, to increase volume of a distant sound and enhance a sense of hearing the sound closer. The mobile phone generates an audio file corresponding to the zoom angle of view based on audio data obtained after the audio processing, to record and obtain the audio corresponding to the zoom angle of view.

(3) Front-Facing Angle of View

At the front-facing angle of view, the user wants to record a front-facing video image, which is usually a selfie image of the user. Correspondingly, at the front-facing angle of view, the user usually wants to obtain a human voice during selfie taking. Therefore, at the front-facing angle of view, the mobile phone may record a human voice within a front-facing range, and suppress another sound.

Figure 11:
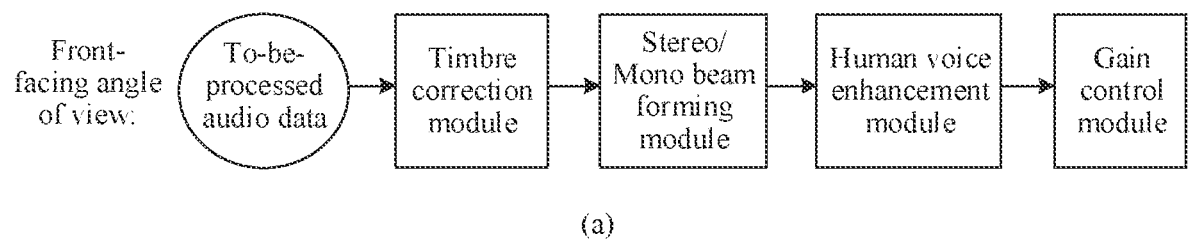
FIG. 11 is a schematic diagram of another audio processing solution and another audio beam according to an embodiment of this application.
Figure 11:
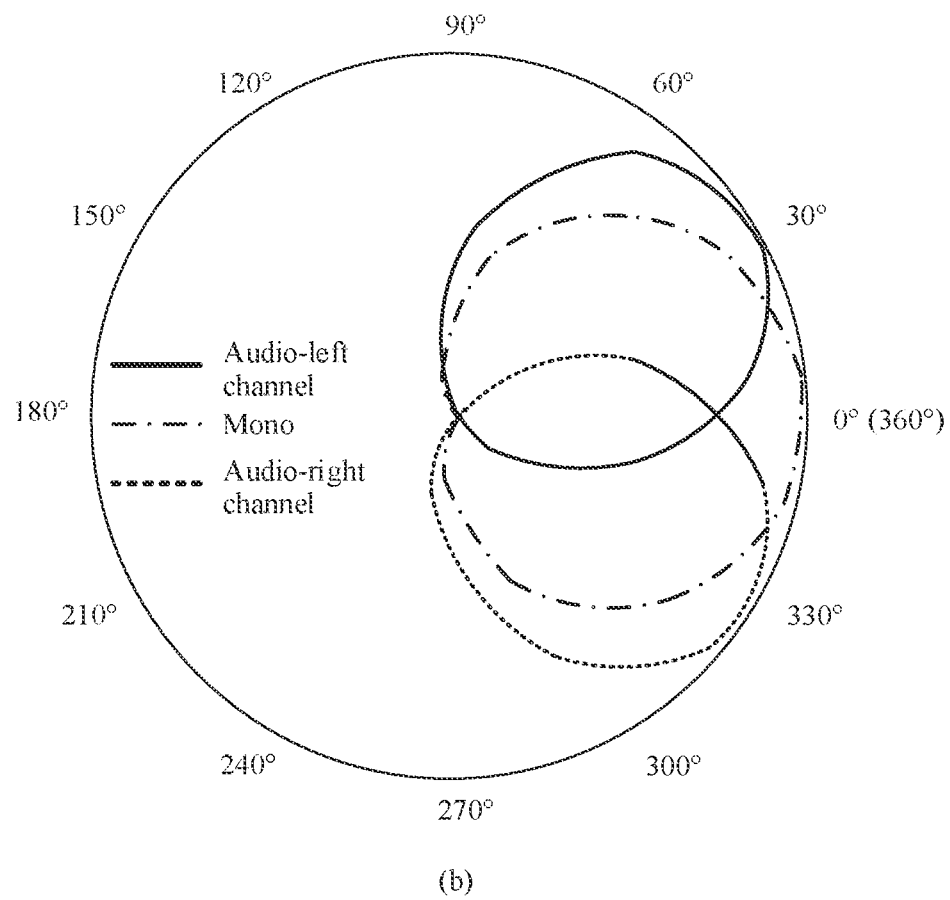

For example, for an audio processing solution corresponding to the front-facing angle of view, refer to (a) in FIG. 11. As shown in (a) in FIG. 11, the to-be-processed audio data separately passes through a timbre correction module, a stereo/mono beam forming module, a human voice enhancement module, a gain control module, and the like. A function of the timbre correction module is similar to a function of the module at the wide-angle angle of view. The stereo/mono beam forming module is configured to form a stereo beam or a mono beam, so as to retain an audio signal within a coverage range of the stereo beam or the mono beam. The human voice within the front-facing range needs to be picked up at the front-facing angle of view, and the front-facing range is smaller than the sound pickup range at the wide-angle angle of view. Therefore, a stereo beam or a mono beam may be used. Compared with the stereo beam module at the wide-angle angle of view, the stereo/mono beam module may narrow an included angle of the mono beam, or narrow an included angle of the stereo beam. A beam gain of the stereo/mono beam within the front-facing range is relatively large, so that a sound within the front-facing range can be retained, a sound outside the front-facing range can be suppressed, to highlight the sound within the front-facing range. For example, (b) in FIG. 11 is a schematic diagram of a stereo beam corresponding to the front-facing angle of view. A solid-line beam represents a left-channel beam, a dashed-line beam represents a right-channel beam, and a 0-degree direction is aligned with a front-facing camera direction. The front-facing camera direction is a direction perpendicular to a surface of the mobile phone in the front of the mobile phone, and a perpendicular foot is a camera. The human voice enhancement module is configured to perform enhancement processing on the human voice, for example, may enhance a harmonic part of the human voice to improve definition of the human voice. A function of the gain control module is similar to a function of the module at the wide-angle angle of view. The mobile phone generates an audio file corresponding to the front-facing angle of view based on audio data obtained after the audio processing, to record and obtain the audio corresponding to the front-facing angle of view.

For example, if the target shooting mode is the shooting mode 1 shown in Table 1, the mobile phone may record audio corresponding to the wide-angle angle of view on the channel 1 and audio corresponding to the zoom angle of view on the channel 2.

In another example, if the target shooting mode is the shooting mode 4 shown in Table 1, the mobile phone may record audio corresponding to the wide-angle angle of view on the channel 1, audio corresponding to the zoom angle of view on the channel 2, and audio corresponding to the front-facing angle of view on the channel 3.

In some embodiments, when recording audio corresponding to the plurality of channels of video images, the mobile phone may display recording prompt information on each channel of video image to prompt the user that the audio corresponding to the plurality of channels of video images is being recorded currently. For example, the audio recording prompt information may be microphone marks 701 and 702 shown in (a) in FIG. 7.

In Case 2, in the multi-channel video recording process, a shooting angle of view corresponding to each channel of video image may change. In addition, the mobile phone determines the shooting angle of view corresponding to each channel of video image based on a front-facing/rear-facing feature and a value relationship between a zoom ratio corresponding to each channel of video image and a preset value. When the plurality of channels of video images include the first channel of video image and the second channel of video image, the mobile phone determines the shooting angle of view corresponding to the first channel of video image based on a front-facing/rear-facing feature and a value relationship between a zoom ratio corresponding to the first channel of video image and the preset value, and determines the shooting angle of view corresponding to the second channel of video image based on a front-facing/rear-facing feature and a value relationship between a zoom ratio corresponding to the second channel of video image and the preset value. A front-facing/rear-facing feature corresponding to a channel of video image indicates whether the channel of video image is a front-facing video image or a rear-facing video image.

The audio processing manner in Case 2 is similar to that in Case 1, and the following mainly describes differences.

In Case 2, the target shooting mode in step 303 may be a shooting mode shown in Table 2. The target shooting mode may be a preset shooting mode (for example, the shooting mode a), a shooting mode used last time, a shooting mode indicated by the user, or the like.

In Case 2, when the mobile phone records audio corresponding to each channel of video image in step 306, for each channel of video image, because the shooting angle of view may be switched in real time, the mobile phone may perform audio processing by using an audio processing solution corresponding to a current shooting angle of view, and record, in real time, audio matching the current shooting angle of view. In this way, each channel of video image may correspond to audio corresponding to different shooting angles of view.

For example, the target shooting mode is the shooting mode a shown in Table 2, and video images corresponding to the shooting mode a include a channel 1 and a channel 2. For the channel 1, as a value relationship between a zoom ratio corresponding to the channel 1 and the preset value changes, a shooting angle of view may be switched in real time between the rear-facing wide-angle angle of view and the rear-facing zoom angle of view. For the channel 2, a shooting angle of view is the front-facing angle of view.

In step 306, when the target shooting mode is the shooting mode a shown in Table 2, for the channel 1, when the shooting angle of view is the wide-angle angle of view, the mobile phone records audio according to an audio processing solution corresponding to the wide-angle angle of view. When the shooting angle of view is switched to the zoom angle of view, the mobile phone records audio according to an audio processing solution corresponding to the wide-angle angle of view. In this way, the audio corresponding to the video image of the channel 1 may include the audio corresponding to the wide-angle angle of view and the audio corresponding to the zoom angle of view. For example, for the channel 1, if the shooting angle of view is first the wide-angle angle of view, then switched to the zoom angle of view, and then switched to the wide-angle angle of view, the audio corresponding to the channel 1 includes audio corresponding to the wide-angle angle of view, audio corresponding to the zoom angle of view, and other audio corresponding to the wide-angle angle of view. For the channel 2, the mobile phone records audio according to an audio processing solution corresponding to the front-facing angle of view, and audio corresponding to the channel 2 is audio corresponding to the front-facing angle of view.

307: After detecting an operation that the user indicates to stop shooting, the mobile phone stops recording a video image and audio, and generates a multi-channel recorded video.

Figure 7:
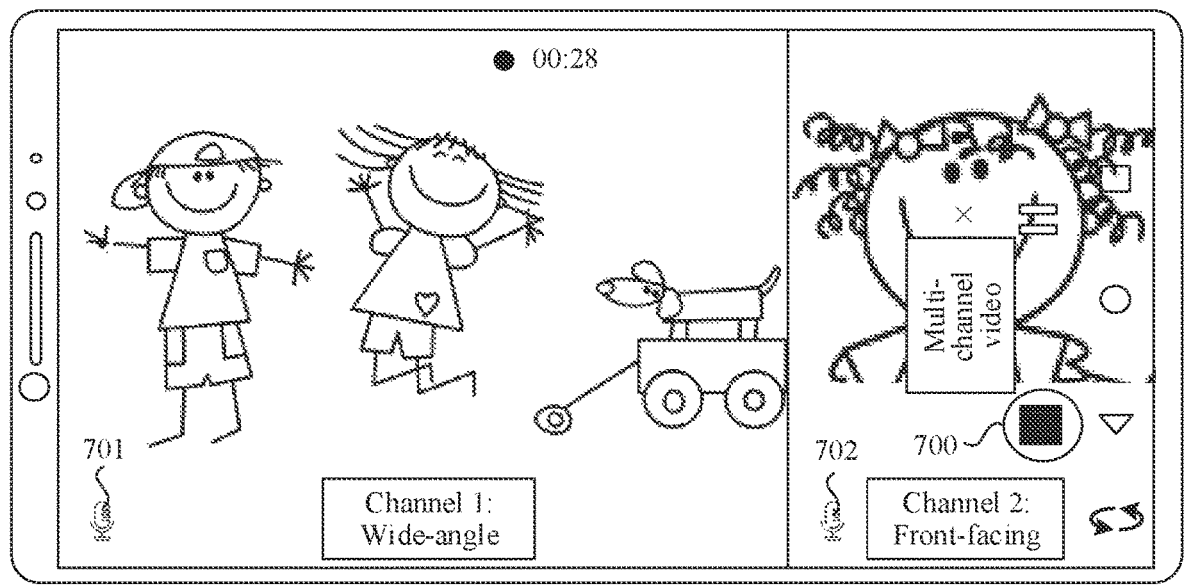
FIG. 7 is a schematic diagram of another group of interfaces according to an embodiment of this application.
Figure 7:
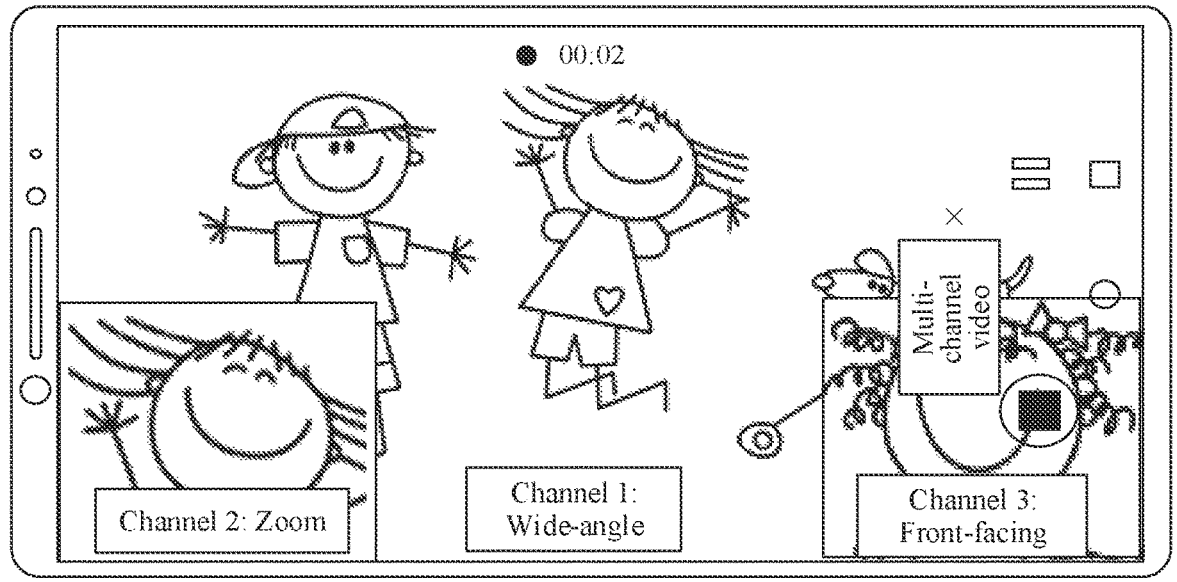

For example, the operation that the user indicates to stop shooting may be a tapping operation of the user on a control 700 shown in (a) in FIG. 7, an operation that the user indicates to stop shooting by using a voice, or another operation such as a gesture. This is not limited in this embodiment of this application.

After detecting the operation that the user indicates to stop shooting, the mobile phone generates a plurality of channels of recorded videos and returns to the video recording preview interface or the shooting preview interface. The multi-channel recorded video includes the plurality of channels of video images and the plurality of channels of audio. For example, for a thumbnail of the multi-channel recorded video generated by the mobile phone, refer to a thumbnail 1201 shown in (a) in FIG. 12, or a thumbnail 1202 shown in (b) in FIG. 12.

In some embodiments, for the multi-channel recorded video recorded by using the method provided in this embodiment of this application, the mobile phone may prompt the user that the video has a plurality of channels of audio. For example, the thumbnail of the multi-channel recorded video or detailed information about the multi-channel recorded video may include prompt information used to indicate the plurality of channels of audio. For example, the prompt information may be a mark 1203 of a plurality of speakers shown in (b) in FIG. 12, a mark in another form, or text information.

In some other embodiments, the mobile phone may store a video file corresponding to each channel of recorded video. The video file corresponding to each channel of recorded video can also be displayed in Gallery. For example, refer to (c) in FIG. 12. A file indicated by a thumbnail 1204 in Gallery includes files corresponding to all channels of recorded video images and files corresponding to all channels of audio. Refer to (c) in FIG. 12. A file indicated by a thumbnail 1205 in Gallery includes files corresponding to a video image and audio in a wide-angle angle of view corresponding to a channel 1. A file indicated by a thumbnail 1206 in Gallery includes files corresponding to a video image and audio in a wide-angle angle of view corresponding to a channel 2.

308: After detecting an operation that the user indicates to play the multi-channel recorded video, the mobile phone plays a video image and audio of the multi-channel recorded video.

Figure 12:
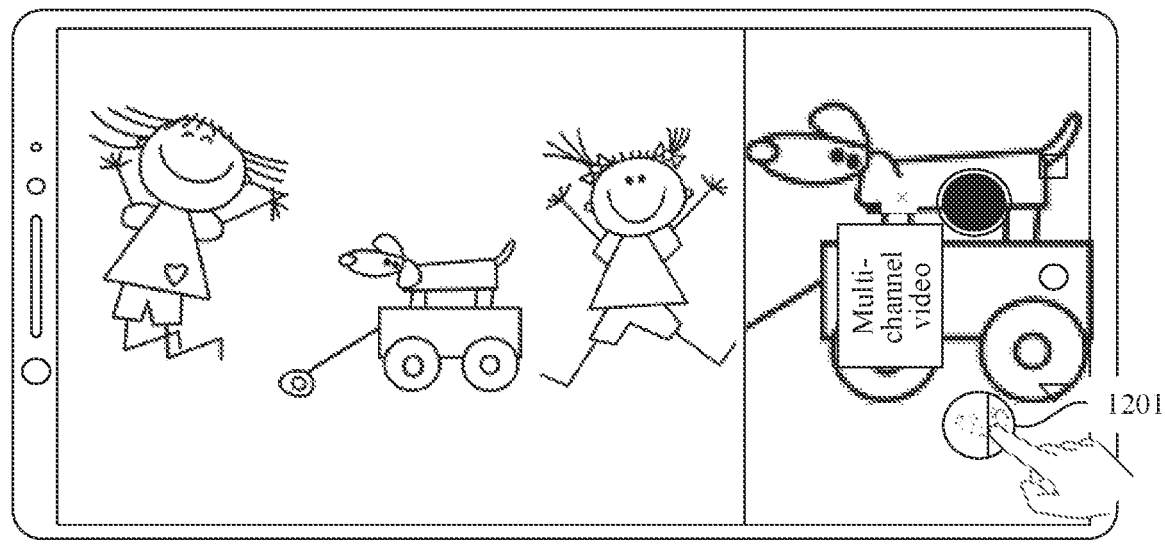
FIG. 12 is a schematic diagram of another group of interfaces according to an embodiment of this application.
Figure 12:
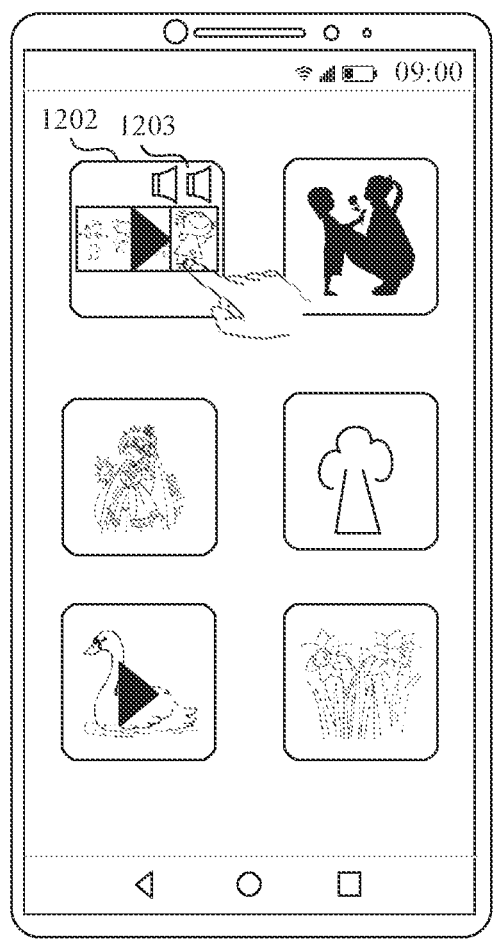
Figure 12:
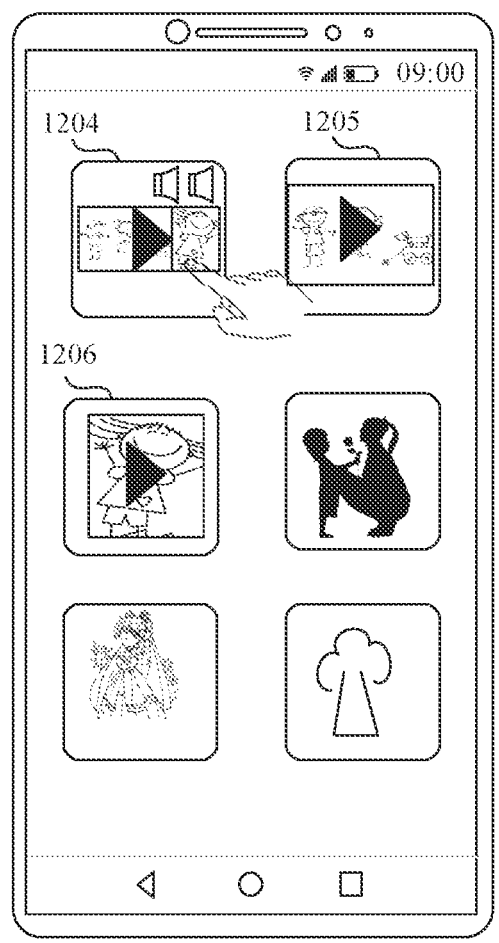

For example, the operation that the user indicates to play the multi-channel recorded video may be a tapping operation of the user on the thumbnail 1201 in a video recording preview interface shown in (a) in FIG. 12. For another example, the operation that the user indicates to play the multi-channel recorded video may be a tapping operation of the user on the thumbnail 1202 in Gallery shown in (b) in FIG. 12.

After detecting the operation that the user indicates to play the multi-channel recorded video, the mobile phone plays the multi-channel recorded video based on the plurality of channels of video images and the plurality of channels of audio that are recorded in the multi-channel video recording process. That is, during video playback, the mobile phone plays the video images and the audio that are recorded in the multi-channel video recording process.

In some other embodiments, during video playback, the mobile phone may play the channels of recorded video images. That is, the mobile phone displays a video play interface, and the video play interface includes each channel of video image. For audio playback, in some technical solutions, during video playback, the mobile phone may play audio corresponding to a shooting angle of view/channel specified by the user. Alternatively, during video playback, the mobile phone may play, by default, audio corresponding to a preset channel/preset shooting angle of view. For example, the preset channel is a channel on the left on the video play interface. For another example, the audio corresponding to the preset shooting angle of view is the audio corresponding to the wide-angle angle of view. During video playback, the mobile phone may play the audio corresponding to the wide-angle angle of view. Subsequently, the mobile phone may further play, after switching based on an indication of the user, audio corresponding to a different channel/shooting angle of view.

In this way, the mobile phone may play, after switching based on the indication of the user, the audio corresponding to the different channel/shooting angle of view. For example, when the user pays attention to a video image at the wide-angle angle of view, the mobile phone may play audio corresponding to the wide-angle angle of view based on an indication of the user, and the user may hear a panoramic sound. When the user pays attention to a video image at the zoom angle of view, the user pays attention to a distant shot object after zooming in. The mobile phone may play audio corresponding to the zoom angle of view based on an indication of the user, and the user may focus on hearing a sound after zooming in within a zoom range. When the user pays attention to a video image at the front-facing angle of view, the user pays attention to a person in a front-facing direction. The mobile phone may play audio corresponding to the front-facing angle of view based on an indication of the user, and the user may focus on hearing a human voice in the front-facing direction.

For example, the target shooting mode is the shooting mode 4 shown in Table 1. For the video play interface, refer to FIG. 13(a). The video play interface includes a video image 1301 corresponding to the wide-angle angle of view on the channel 1, a video image 1302 corresponding to the zoom angle of view on the channel 2, and a video image 1303 corresponding to the front-facing angle of view on the channel 3. The video play interface further includes an audio play control 1304 corresponding to the video image 1301, an audio play control 1305 corresponding to the video image 1302, and an audio play control 1306 corresponding to the video image 1303. An audio play control corresponding to each channel of video image may be used to control playing/stopping playing audio corresponding to the channel of video image.

Figure 13A:
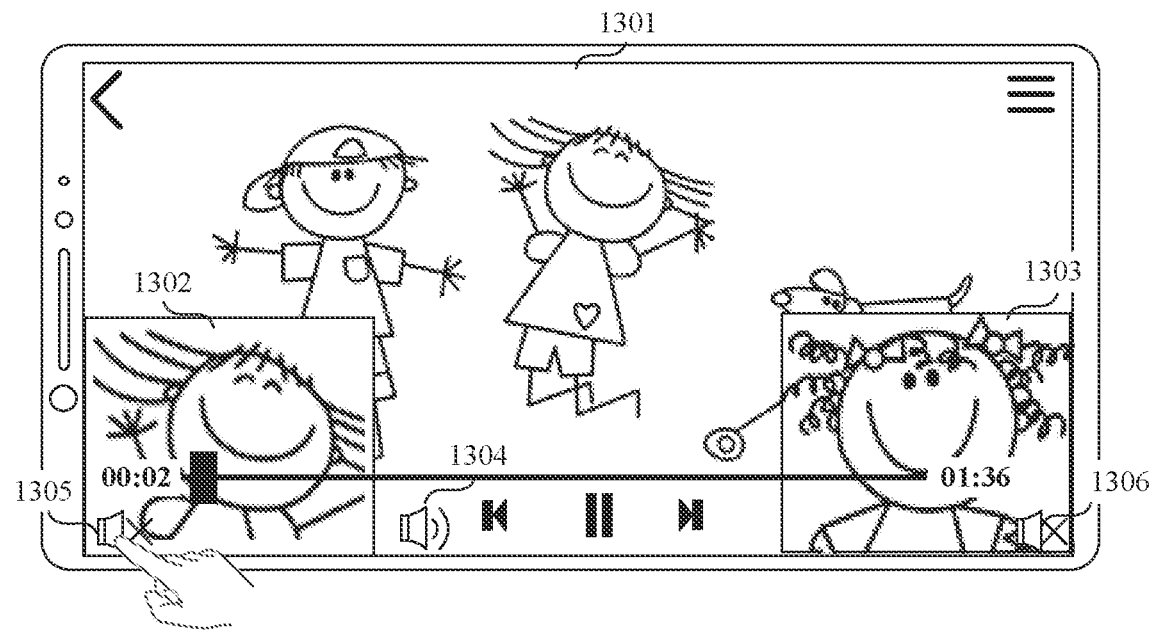
FIG. 13(*a*) to FIG. 13(*c*) are a schematic diagram of another group of interfaces according to an embodiment of this application.
Figure 13B:
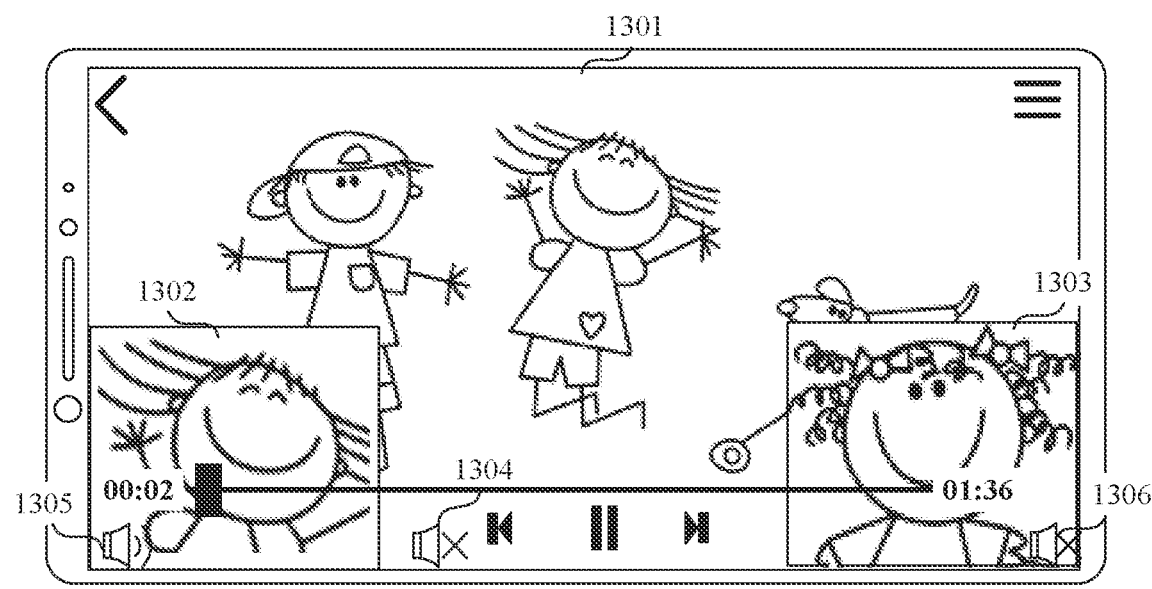

As shown in FIG. 13(a), during video playback, the mobile phone may play, by default, audio corresponding to the video image 1301 at the wide-angle angle of view. The audio play control 1304 is in a play state, and the audio play control 1305 and the audio play control 1306 are in a non-play state. If the mobile phone detects an operation of tapping the audio play control 1305 shown in FIG. 13(a) by the user, the mobile phone plays audio 2 corresponding to the video image 1302 and the zoom angle of view. As shown in FIG. 13(b), the audio play control 1305 changes to a play state. In some implementations, as shown in FIG. 13(b), the audio play control 1304 automatically changes to a non-play state, and the mobile phone plays the audio 2 and stops playing audio 1. That is, the mobile phone plays only one channel of audio at a moment, to avoid audio mixing caused by simultaneous playing of a plurality of channels of audio. In some other implementations, the audio play control 1304 is still in a play state, and the mobile phone simultaneously plays the audio 1 and the audio 2.

It may be understood that when the target shooting mode is another shooting mode in Table 1, the video play interface may include any two of the video image 1301, the video image 1302, or the video image 1303, and correspondingly, may include any two of the audio play control 1304, the audio play control 1305, or the audio play control 1306.

Figure 13C:
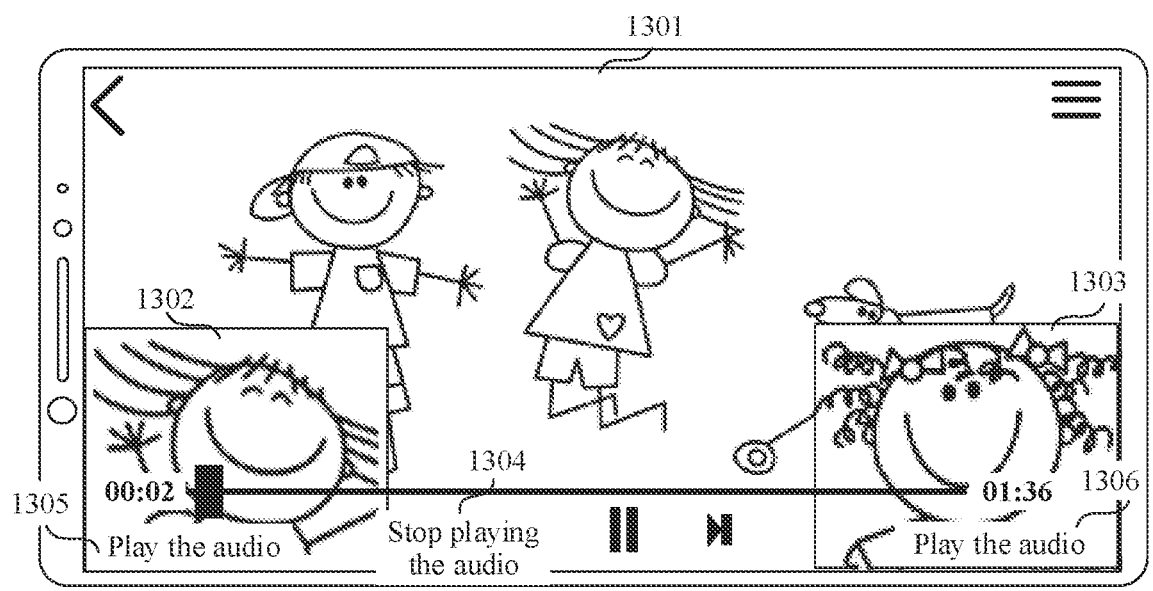

It should be noted that the audio play control shown in FIG. 13(a) and FIG. 13(b) is in a form of a speaker, and the audio play control may also be in another form, or may be located in another position on the video play interface. This is not limited in this embodiment of this application. For example, refer to FIG. 13(c). The audio play control may alternatively be text information "play the audio/stop playing the audio".

For another example, the mobile phone may play audio corresponding to a specified shooting angle of view/channel based on a voice indication of the user.

In some other technical solutions, during video playback, the mobile phone may preferentially play a channel of audio corresponding to a shooting angle of view/channel with a high priority. For example, a priority of the front-facing angle of view is higher than that of the zoom angle of view, and a priority of the zoom angle of view is higher than that of the wide-angle angle of view. For another example, a channel with a larger display area has a higher priority. Subsequently, the mobile phone may further play, after switching based on an indication of the user, audio corresponding to a different channel/shooting angle of view.

In some other embodiments, during video playback, the mobile phone may play only one channel of video image, that is, display only one channel of video image on the video play interface, and automatically play audio corresponding to the channel of video image.

In some technical solutions, during video playback, the mobile phone displays all channels of video images by default. After detecting an operation that the user indicates to display only a channel of video image, the mobile phone may display the channel of video image in a scaling up manner or in full screen, and automatically play audio corresponding to the channel of video image.

Figure 14:
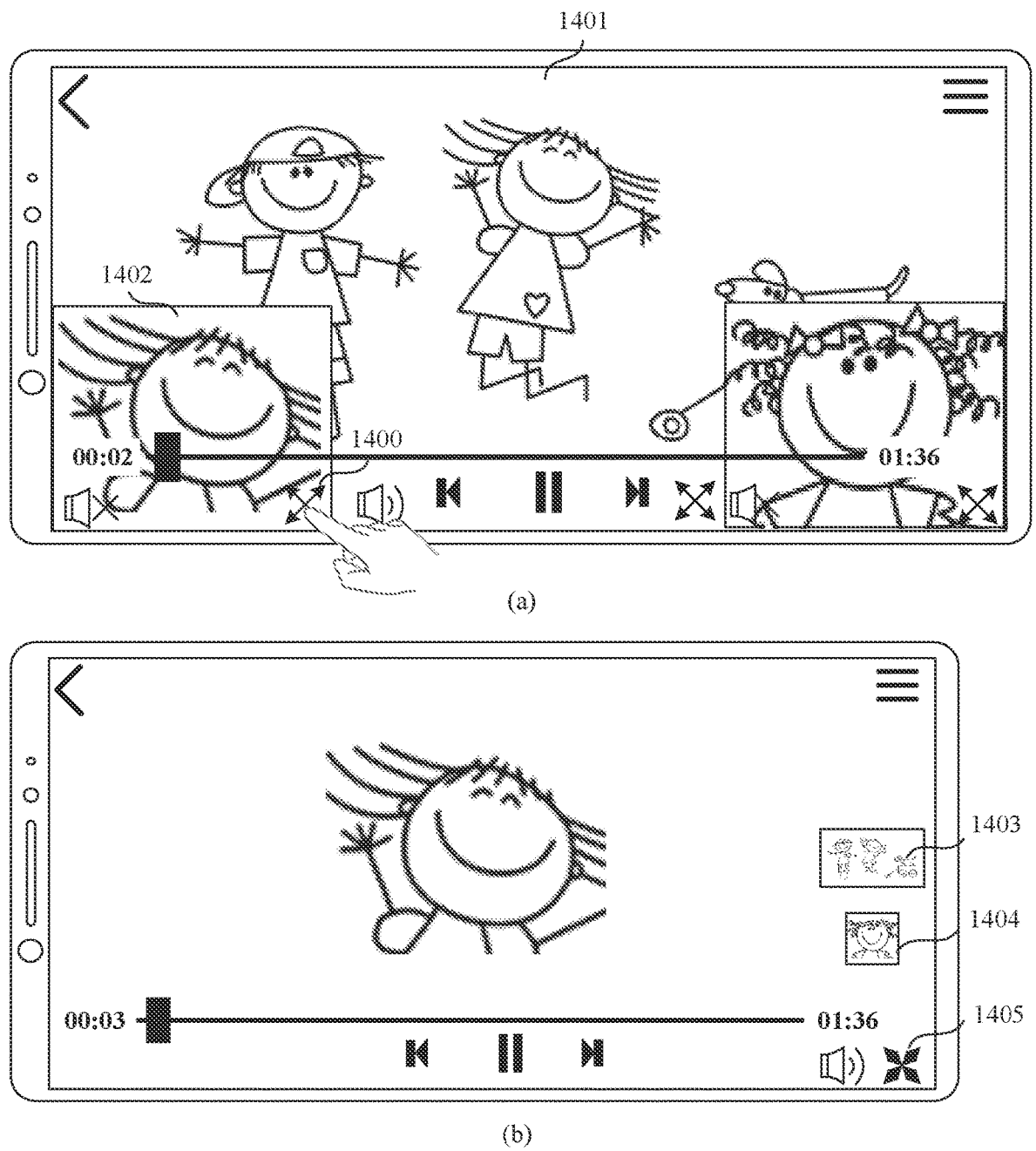
FIG. 14 is a schematic diagram of another group of interfaces according to an embodiment of this application.

For example, refer to (a) in FIG. 14. During video playback, the mobile phone plays all the channels of video images and audio 1 corresponding to a video image 1401. After the mobile phone detects an operation of tapping a full-screen display control 1400 shown in (a) in FIG. 14 by the user, as shown in (b) in FIG. 14, the mobile phone displays, in full screen, a video image 1402 corresponding to the zoom angle of view, stops displaying video images corresponding to the wide-angle angle of view and the front-facing angle of view, and automatically plays audio 2 corresponding to the video image 1402. Subsequently, after detecting an operation of tapping a control 1403 by the user, the mobile phone may play the video image 1401 in full screen and the audio 1. After detecting an operation of tapping a control 1404 by the user, the mobile phone may play, in full screen, a video image corresponding to the front-facing angle of view and audio 3. After detecting an operation of tapping a control 1405 by the user, the mobile phone may resume displaying a plurality of channels of video images shown in (a) in FIG. 14.

In the solution described in the foregoing embodiment, in Case 1 in which the shooting angle of view of each channel of video is fixed, the mobile phone may switch video images and audio corresponding to different channels/shooting angles of view, so that the played audio matches the shooting angle of view and video image that the user pays attention to in real time, to improve audio experience of the user.

In the solution described in the foregoing embodiment, in Case 2 in which the shooting angle of view of each channel of video is variable, when playing audio corresponding to any channel, the mobile phone may play a video image and audio corresponding to a shooting angle of view that changes in real time, so that the audio matches the shooting angle of view and the video image in real time, to improve audio experience of the user.

In addition, after detecting a tapping operation of the user on the thumbnail 1205 shown in (c) in FIG. 12, the mobile phone may play a single channel of video image and audio that correspond to the wide-angle angle of view. After detecting a tapping operation of the user on the thumbnail 1206 shown in (c) in FIG. 12, the mobile phone may play a single channel of video image and audio that correspond to the zoom angle of view.

The foregoing description is based on an example in which each channel of video image corresponds to one channel of audio in Solution 1. In Solution 2, the mobile phone may not need to generate audio corresponding to each channel of video image, but may generate audio corresponding to some channels based on an indication of the user.

In Solution 2, in the multi-channel video recording mode, the mobile phone may obtain audio corresponding to M of N channels in the target shooting mode, where N>M. In an implementation, one shooting angle of view corresponds to one channel of audio, one channel of audio corresponds to one channel, and some channels correspond to no audio. For example, the target shooting mode is the shooting mode 4 shown in Table 1, three channels are included, and the mobile phone generates only two channels of audio based on an indication of the user. One channel of audio corresponds to the wide-angle angle of view, and the other channel of audio corresponds to the front-facing angle of view.

During video playback, the mobile phone may play an audio corresponding to a channel of video image based on an indication of the user. For example, when the mobile phone plays a channel of video image in a scaling up manner or in full screen during video playback, the mobile phone may automatically play audio corresponding to the channel of video image. If the channel of video image corresponds to no audio, the mobile phone may automatically play audio corresponding to a preset shooting angle of view (for example, the wide-angle angle of view), or the mobile phone does not play audio.

In some other implementations, each shooting angle of view corresponds to one channel of audio, and each channel of audio may correspond to one or more channels. For example, the target shooting mode is the shooting mode 4 shown in Table 1, and three channels are included. The mobile phone generates only two channels of audio. One channel of audio corresponds to the front-facing angle of view, and the other channel of audio corresponds to the wide-angle angle of view and the zoom angle of view. During video playback, the mobile phone may play an audio corresponding to a channel of video image based on an indication of the user.

In this way, in Solution 2, the mobile phone may switch video images and audio corresponding to different channels/shooting angles of view, so that played audio matches a shooting angle of view and a video image that the user pays attention to in real time, to improve audio experience of the user.

Figure 15:
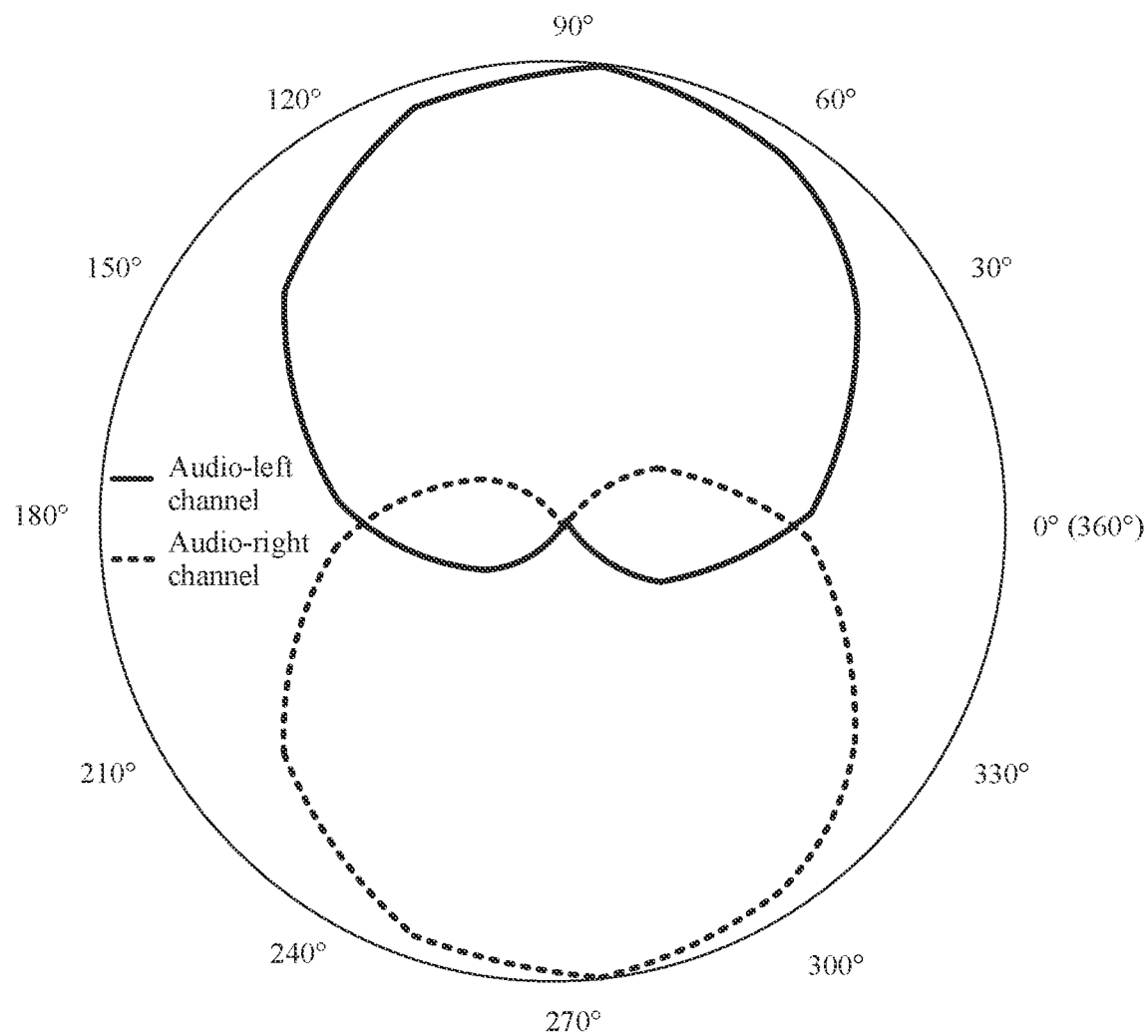
FIG. 15 is a schematic diagram of another audio beam according to an embodiment of this application.

In some other embodiments, if the mobile phone includes a microphone at the top and two built-in microphones at the bottom, the mobile phone may also generate audio corresponding to the wide-angle angle of view. For example, in this scenario, for a schematic diagram of a stereo beam, refer to FIG. 15. An included angle of the stereo beam is 180°. In this case, audio corresponding to the zoom angle of view and the front-facing angle of view may be picked up by using an accessory microphone.

In some other embodiments, the mobile phone may collect a sound signal within a zoom range by using a directional microphone, to generate corresponding to-be-processed audio data based on the collected sound signal, and further process the to-be-processed audio data and record audio corresponding to the zoom angle of view. The directional microphone may be a built-in component or an external accessory of the mobile phone. For example, the directional microphone is an external component, and may point to a rear-facing camera direction to cover a rear-facing zoom range, so as to collect a sound signal within the zoom range. In this case, audio corresponding to the wide-angle angle of view and the front-facing angle of view may be picked up by using a built-in microphone or an accessory microphone. For example, audio corresponding to the wide-angle angle of view may be picked up by using an MS recording accessory, and audio corresponding to the front-facing angle of view may be picked up by using a cardioid directional microphone accessory.

Figure 16:
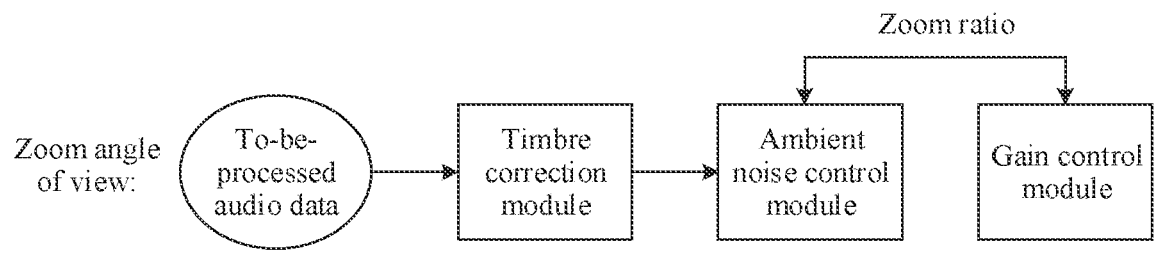
FIG. 16 is a schematic diagram of another audio processing solution according to an embodiment of this application.

Because the directional microphone has cardioid or super-cardioid directionality, the directional microphone may point to a direction within a zoom range, to collect a sound signal within the zoom range. In this scenario, refer to FIG. 16. An audio processing solution corresponding to the zoom angle of view may not include a beam forming module.

Figure 17:
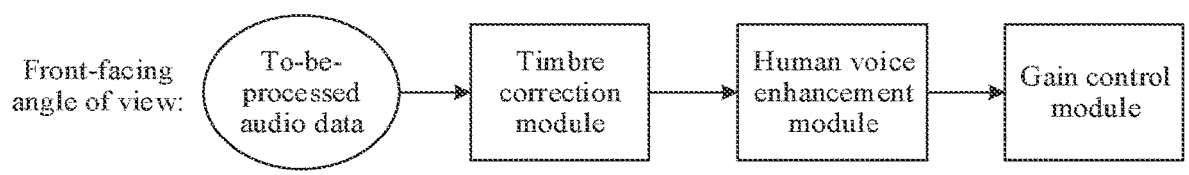
FIG. 17 is a schematic diagram of another audio processing solution according to an embodiment of this application.

In some other embodiments, the mobile phone may collect a sound signal within a front-facing range by using a directional microphone, to generate corresponding to-be-processed audio data based on the collected sound signal, and further process the to-be-processed audio data and record audio corresponding to the front-facing angle of view. For example, the directional microphone is an external component, and may point to a front-facing camera direction, to collect a sound signal within the front-facing range. Therefore, as shown in FIG. 17, an audio processing solution corresponding to the front-facing angle of view may not include a beam forming module. In this case, audio corresponding to the wide-angle angle of view and the zoom angle of view may be picked up by using a built-in microphone or an accessory microphone. For example, audio corresponding to the wide-angle angle of view may be picked up by using an MS recording accessory, and audio corresponding to the zoom angle of view may be picked up by using a directional microphone accessory.

Figure 18:
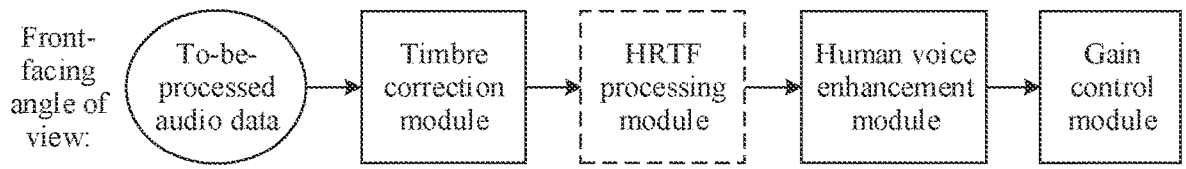
FIG. 18 is a schematic diagram of another audio processing solution according to an embodiment of this application.

The directional microphone may be a microphone on a headset. For example, the user may place the headset in front of the mobile phone, or may place the microphone towards the user. The headset includes but is not limited to a wired headset, a TWS headset, or the like. If the headset provides stereo data, as shown in FIG. 18, the audio processing solution corresponding to the front-facing angle of view further includes a head related transfer function (head related transfer function, HRTF) processing module, configured to process the stereo data, so that the processed audio is closer to real hearing of the binaural at that time.

In some other embodiments, in a conventional video recording mode (that is, a single-channel video recording mode), a shooting angle of view may also be switched. When recording a video image, the mobile phone may further record corresponding audio based on a shooting angle of view that changes in real time. During video playback, the mobile phone can play the audio that matches the shooting angle of view in real time. In this way, audio recorded by the mobile phone matches in real time a shooting angle of view and a recorded video image that the user pays attention to, so that audio experience of the user can be improved. For example, at the beginning, the mobile phone records a video image at the wide-angle angle of view, and the mobile phone records audio according to the audio processing solution corresponding to the wide-angle angle of view. Then, in a current video recording process, the mobile phone records, after switching, a video image at the zoom angle of view, and the mobile phone records audio according to the audio processing solution corresponding to the zoom angle of view. During video playback, when playing the video image at the wide-angle angle of view, the mobile phone plays the audio corresponding to the wide-angle angle of view, and the user can hear a panoramic sound. When playing the video image at the zoom angle of view, the mobile phone plays the audio corresponding to the zoom angle of view, and the user can hear a distant sound after zooming in within a zoom range.

For another example, at the beginning, the mobile phone records a video image at the wide-angle angle of view, and the mobile phone records audio according to the audio processing solution corresponding to the wide-angle angle of view. Then, in a current video recording process, the mobile phone records, after switching, a video image at the front-facing angle of view, and the mobile phone records audio according to the audio processing solution corresponding to the front-facing angle of view. During video playback, when playing the video image at the wide-angle angle of view, the mobile phone plays the audio corresponding to the wide-angle angle of view, and the user can hear a panoramic sound. When playing the video image at the front-facing angle of view, the mobile phone plays the audio corresponding to the front-facing angle of view, and the user can hear a human voice in a front-facing direction.

In the foregoing embodiment, audio in a multi-channel recorded video is generated in real time in a video recording process. In some other embodiments, the mobile phone may collect a sound signal in the video recording process, after the video recording is completed, generate audio corresponding to each channel of video image based on the collected sound signal and shooting angles of view used in the video recording process, to reduce a requirement on a processing capability of the mobile phone in the video recording process.

It may be understood that, to implement the foregoing functions, the electronic device includes corresponding hardware and/or a software module for performing each function. Algorithm steps in the examples described with reference to embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In the embodiments, the electronic device may be divided into functional modules based on the foregoing method examples. For example, each functional module corresponding to each function may be obtained through division, or two or more functions may be integrated into one processing module. The integrated module may be implemented in the form of hardware. It should be noted that, in embodiments, division into the modules is an example and is merely logical function division, and may be other division in an actual implementation.

Embodiments of this application further provide an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the foregoing related method steps, to implement the audio processing method in the foregoing embodiment.

The embodiments of this application further provide a computer-readable storage medium. The computer-readable storage medium stores computer instructions. When the computer instructions are run on an electronic device, the electronic device is enabled to perform the related method steps, to implement the audio processing method in the foregoing embodiment.

The embodiments of this application further provide a computer program product. When the computer program product is run on a computer, the computer is enabled to perform the foregoing related steps, to implement the audio processing method performed by the electronic device in the foregoing embodiment.

In addition, embodiments of this application further provide an apparatus. The apparatus may be specifically a chip, a component, a module, or a chip system. The apparatus may include a processor and a memory that are connected. The memory is configured to store computer-executable instructions, and when the apparatus runs, the processor may execute the computer-executable instructions stored in the memory, so that the chip performs the audio processing method performed by the electronic device in the foregoing method embodiment.

The electronic device, the computer-readable storage medium, the computer program product, or the chip provided in the embodiments is configured to perform the corresponding method provided above. Therefore, for beneficial effects that can be achieved, refer to the beneficial effects in the corresponding method provided above. Details are not described herein again.

Based on descriptions of the foregoing implementations, a person skilled in the art may understand that, for the purpose of convenient and brief descriptions, division into the foregoing functional modules is merely used as an example for description. In actual application, the foregoing functions can be allocated to different functional modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. An audio processing method, comprising:
    displaying, by an electronic device, a shooting preview interface after detecting an operation of opening a camera application by a user;
    entering, by the electronic device, a multi-channel video recording mode;
    determining, by the electronic device, a target shooting mode from a plurality of shooting modes in the multi-channel video recording mode;
    displaying, by the electronic device, a video recording preview interface corresponding to the target shooting mode;
    displaying, by the electronic device, a shooting interface after detecting a shooting operation of the user, wherein the shooting interface comprises a plurality of channels of video images;
    recording, by the electronic device, a multi-channel video; and
    recording, by the electronic device, audio corresponding to each of the plurality of channels of video images based on a shooting angle of view corresponding to each channel of video image.

2. The method according to claim 1, wherein each channel of video image corresponds to one shooting angle of view.

3. The method according to claim 2, wherein the shooting angle of view corresponding to each channel of video image is variable.

4. The method according to claim 1, wherein after the recording, by the electronic device, audio corresponding to each channel of video image, the method further comprises:
    generating, by the electronic device and after detecting an operation of stopping shooting by the user, a recorded multi-channel video, wherein the recorded multi-channel video comprises the audio corresponding to each channel of video image; and
    displaying, by the electronic device, a video play interface after detecting an operation of playing the recorded multi-channel video by the user, wherein the video play interface comprises the plurality of channels of video images.

5. The method according to claim 4, wherein after the detecting, by the electronic device, an operation of playing the recorded multi-channel video by the user, the method further comprises:
    after detecting an operation of playing audio corresponding to a first channel of video image in the plurality of channels of video images by the user, playing, by the electronic device, the audio corresponding to the first channel of video image; and
    if the electronic device plays audio corresponding to a second channel of video image before playing the audio corresponding to the first channel of video image, stopping, by the electronic device, playing the audio corresponding to a second channel of video image.

6. The method according to claim 5, wherein before the detecting, by the electronic device, an operation of playing audio corresponding to a first channel of video image by the user, the method further comprises:
    playing, by the electronic device by default, audio corresponding to the second channel of video image in the plurality of channels of video images.

7. The method according to claim 4, wherein after the displaying, by the electronic device, a video play interface, the method further comprises:
    after detecting an operation of playing a first channel of video image in the plurality of channels of video images by the user, displaying, by the electronic device, the first channel of video image on the video play interface and stopping displaying a channel of video image other than the first channel of video image; and
    automatically playing, by the electronic device, audio corresponding to the first channel of video image.

8. The method according to claim 1, wherein
the target shooting mode indicates a quantity of channels of to-be-recorded video images; and
wherein the displaying, by the electronic device, a shooting interface comprises:
    displaying, by the electronic device, the shooting interface based on the quantity of channels of to-be-recorded video images corresponding to the target shooting mode.

9. The method according to claim 8, wherein:
the target shooting mode further indicates a correspondence between each channel of video image and a shooting angle of view; and
the recording, by the electronic device, audio corresponding to each of the plurality of channels of video images based on a shooting angle of view corresponding to each channel of video image comprises:
    determining, by the electronic device based on the correspondence that is between each channel of video image and a shooting angle of view and that corresponds to the target shooting mode, the shooting angle of view corresponding to each channel of video image; and
    recording, by the electronic device, the audio corresponding to each channel of video image based on the shooting angle of view corresponding to each channel of video image.

10. The method according to claim 9, wherein the target shooting mode comprises:
a combination mode of a wide-angle angle of view and a zoom angle of view, a combination mode of a wide-angle angle of view and a front-facing angle of view, a combination mode of a zoom angle of view and a front-facing angle of view, or a combination mode of a wide-angle angle of view, a zoom angle of view, and a front-facing angle of view, wherein a zoom ratio corresponding to the wide-angle angle of view is less than or equal to a preset value, and a zoom ratio corresponding to the zoom angle of view is greater than the preset value.

11. The method according to claim 8, wherein the recording, by the electronic device, audio corresponding to each of the plurality of channels of video images based on a shooting angle of view corresponding to each channel of video image comprises:
determining, by the electronic device, the shooting angle of view corresponding to each channel of video image based on a front-facing/rear-facing feature and a value relationship between a zoom ratio corresponding to each channel of video image and a preset value; and
recording, by the electronic device, the audio corresponding to each channel of video image based on the shooting angle of view corresponding to each channel of video image.

12. The method according to claim 1, wherein:
a shooting angle of view corresponding to a first channel of video image in the plurality of channels of video images is a first shooting angle of view; and
the recording, by the electronic device, the audio corresponding to the first channel of video image based on the shooting angle of view corresponding to the first channel of video image comprises:
obtaining, by the electronic device, to-be-processed audio data corresponding to the first channel of video image based on a collected sound signal;
performing, by the electronic device, timbre correction processing, stereo beam forming, and gain control processing on the to-be-processed audio data based on the first shooting angle of view; and
recording, by the electronic device, the audio corresponding to the first channel of video image based on audio data that has undergone the gain control processing.

13. An electronic device, comprising:
a plurality of microphones configured to collect sound signals;
a plurality of cameras configured to capture video images;
a screen configured to display an interface;
an audio player configured to play audio;
one or more processors;
a memory; and
one or more computer programs, wherein the one or more computer programs are stored in the memory, the one or more computer programs comprise instructions, and when the instructions are executed by the electronic device, the electronic device is enabled to perform operations comprising:
displaying a shooting preview interface after detecting an operation of opening a camera application by a user;
entering a multi-channel video recording mode;
determining a target shooting mode from a plurality of shooting modes in the multi-channel video recording mode;
displaying a video recording preview interface corresponding to the target shooting mode;
displaying a shooting interface after detecting a shooting operation of the user, wherein the shooting interface comprises a plurality of channels of video images;
recording a plurality of channels of video images; and
recording audio corresponding to each of the plurality of channels of video images based on a shooting angle of view corresponding to each channel of video image.

14. The electronic device according to claim 13, wherein the plurality of microphones comprise at least three microphones, and at least one microphone is disposed at each of the top, the bottom, and the rear of the electronic device.

15. The electronic device according to claim 13, wherein the operations comprise:
after detecting an operation of playing audio corresponding to a first channel of video image in the plurality of channels of video images by the user, playing the audio corresponding to the first channel of video image; and
if the electronic device plays audio corresponding to a second channel of video image before playing the audio corresponding to the first channel of video image, stopping playing the audio corresponding to a second channel of video image.

16. The electronic device according to claim 13, wherein the operations comprise:
after detecting an operation of playing a first channel of video image in the plurality of channels of video images by the user, displaying the first channel of video image and stopping displaying a channel of video image other than the first channel of video image; and
automatically playing audio corresponding to the first channel of video image.

17. The electronic device according to claim 13, wherein the target shooting mode indicates a quantity of channels of to-be-recorded video images, and the operations comprise:
displaying the shooting interface based on the quantity of channels of to-be-recorded video images corresponding to the target shooting mode.

18. The electronic device according to claim 13, wherein each channel of video image corresponds to one shooting angle of view.

19. The electronic device according to claim 18, wherein the operations comprise:
determining the shooting angle of view corresponding to each channel of video image based on a front-facing/rear-facing feature and a value relationship between a zoom ratio corresponding to each channel of video image and a preset value; and
recording the audio corresponding to each channel of video image based on the shooting angle of view corresponding to each channel of video image.

20. The electronic device according to claim 13, wherein the operations comprise:
generating a recorded multi-channel video after detecting an operation of stopping shooting by the user, wherein the recorded multi-channel video comprises the audio corresponding to each channel of video image; and
displaying a video play interface after detecting an operation of playing the recorded multi-channel video by the user, wherein the video play interface comprises the plurality of channels of video images.

* * * * *